(12) United States Patent
Ganigarakoppal Kantharaju et al.

(10) Patent No.: US 12,353,772 B2
(45) Date of Patent: Jul. 8, 2025

(54) SOFTWARE-RAID-PROTECTED BOOT DATA vSAN SYSTEM

(71) Applicant: Dell Products L.P., Round Rock, TX (US)

(72) Inventors: Nikhith Ganigarakoppal Kantharaju, Hassan (IN); Abhijit Shashikant Mirajkar, Bangalore (IN); Ajay Sukumaran Nair Syamala Bai, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 73 days.

(21) Appl. No.: 18/227,926

(22) Filed: Jul. 29, 2023

(65) Prior Publication Data

US 2025/0036321 A1 Jan. 30, 2025

(51) Int. Cl.
*G06F 3/06* (2006.01)
(52) U.S. Cl.
CPC .......... *G06F 3/0665* (2013.01); *G06F 3/0604* (2013.01); *G06F 3/0689* (2013.01)
(58) Field of Classification Search
CPC ...... G05B 13/00–048; G05B 15/00–02; G05B 17/00–02; G06F 1/00–3296; G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 18/00–41; G06F 17/00–40; G06F 21/00–88;
(Continued)

(56) References Cited

U.S. PATENT DOCUMENTS 6,282,641 B1 * 8/2001 Christensen .......... G06F 9/4406
710/10
6,549,934 B1 * 4/2003 Peterson ............. H04L 49/9078
709/217
(Continued)

OTHER PUBLICATIONS

VSAN Planning and Deployment; vmware; Aug. 20, 2019; retrieved from https://web.archive.org/web/20200717214030mp_/https://docs.vmware.com/en/VMware-vSphere/6.7/vsan-673-planning-deployment-guide.pdf on Feb. 4, 2022 (Year: 2019).*
(Continued)

*Primary Examiner* — Daniel C. Chappell
(74) *Attorney, Agent, or Firm* — Joseph Mencher

(57) ABSTRACT

A software-RAID-protected boot data vSAN system includes a chassis housing a software RAID subsystem coupled to storage devices and to controller devices. The software RAID subsystem designates a RAID controller device and a vSAN controller device from the controller devices, and configures a first subset of the storage devices for boot storage and a second subset of the storage devices for vSAN storage. The software RAID subsystem then provides a RAID path from the RAID controller device to the boot storage provided by the first subset of the storage devices, and provides a vSAN path from the vSAN controller device to the vSAN storage provided by the second subset of the storage devices. The software RAID subsystem then routes boot storage commands along the RAID path, and routes vSAN storage commands along the vSAN path.

20 Claims, 25 Drawing Sheets

(58) Field of Classification Search
CPC ..... G06F 2003/0697; G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153; G06N 3/00–126; G06N 5/00–048; G06N 7/00–08; G06N 10/00; G06N 20/00–20; G06N 99/00–007; G06T 1/00–60; G06V 30/00–43; G11B 20/00–24; G11B 33/00–1493; G11C 11/00–5692; G11C 13/00–06; G11C 14/00–009; G11C 15/00–06; G11C 16/00–3495; G11C 17/00–18; G11C 2207/00–229; G11C 2216/00–30; H01L 25/00–50; H01L 2225/00–1094; H03M 7/00–707; H04L 9/00–38; H04L 12/00–66; H04L 41/00–5096; H04L 49/00–9094; H04L 61/00–59; H04L 67/00–75

See application file for complete search history.

(56) References Cited

U.S. PATENT DOCUMENTS

| | | | | |
|---|---|---|---|---|
| 6,697,924 B2* | 2/2004 | Swank | ................ | G06F 3/0601 711/163 |
| 6,895,467 B2* | 5/2005 | Lubbers | ................ | G06F 3/0601 711/170 |
| 7,584,347 B2* | 9/2009 | El-Haj-Mahmoud | ........................ | G06F 9/4408 713/1 |
| 7,861,117 B2* | 12/2010 | Coronado | ........... | G06F 11/1417 714/36 |
| 8,055,948 B2* | 11/2011 | Pierce | ................... | G06F 9/4406 714/36 |
| 9,601,218 B2* | 3/2017 | Jung | ................... | G06F 9/4401 |
| 9,959,062 B1* | 5/2018 | Piszczek | ............. | G06F 11/1662 |
| 10,241,724 B1* | 3/2019 | Schick | ................... | G06F 3/067 |
| 2003/0172239 A1* | 9/2003 | Swank | ................. | G06F 3/0601 711/112 |
| 2003/0208638 A1* | 11/2003 | Abrams, Jr. | ............ | H04L 69/40 348/575 |
| 2004/0181600 A1* | 9/2004 | Yamagami | .............. | H04L 67/01 709/213 |
| 2013/0268861 A1* | 10/2013 | Bailey | ................... | G06F 9/5072 715/735 |
| 2015/0058555 A1* | 2/2015 | Karamanolis | ......... | G06F 3/0605 711/114 |
| 2019/0065062 A1* | 2/2019 | Knauft | ................... | G06F 3/0689 |
| 2019/0065092 A1* | 2/2019 | Shah | ................... | G06F 3/0617 |
| 2019/0391876 A1* | 12/2019 | Kundu | ................. | G06F 3/0688 |

OTHER PUBLICATIONS

Y. Shinkai, T. Maruyama and N. Yoshi, "Software RAID Technology for cluster environments Yoshitake Shinkai, Tetsutaro Maruyama, Naomi Yoshizawa," 2001 Eighteenth IEEE Symposium on Mass Storage Systems and Technologies, San Diego, CA, USA, 2001, pp. 327-327, doi: 10.1109/MSS.2001.10027. (Year: 2001).*

Y. Birk and E. Zilber, "TPT-RAID: a High Performance Box-Fault Tolerant Storage System," 24th IEEE Conference on Mass Storage Systems and Technologies (MSST 2007), San Diego, CA, USA, 2007, pp. 215-220, doi: 10.1109/MSST.2007.4367975. (Year: 2007).*

* cited by examiner

SOFTWARE-RAID-PROTECTED BOOT DATA vSAN SYSTEM

CROSS-REFERENCE TO RELATED APPLICATIONS

The present application is related to the following co-pending applications: (1) U.S. patent application Ser. No. 18/227,914, filed Jul. 29, 2023; and (2) U.S. patent application Ser. No. 18/227,920, filed Jul. 29, 2023.

BACKGROUND

The present disclosure relates generally to information handling systems, and more particularly to providing software RAID protection for boot data in a vSAN provided by information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices and/or other computing devices known in the art, sometimes include hypervisors that utilize hardware resources in the server device to provide virtual machines. As will be appreciated by one of skill in the art in possession of the present disclosure, the virtual machines discussed above use connected storage devices to store their data, and the protection of such data in the event of the unavailability of any of those storage devices is desirable. An option for protecting data stored on storage devices like those described above includes the utilization of Redundant Array of Independent Disk (RAID) techniques, which one of skill in the art in possession of the present disclosure will recognize is a data storage virtualization technology that combines multiple physical storage devices into one or more logical storage devices for the purposes of data redundancy, performance improvements, and/or other RAID benefits that would be apparent to one of skill in the art in possession of the present disclosure. However, the utilization of RAID techniques on data stored by virtual machines in a server device can raise some issues.

For example, the VMWARE®n ESXi hypervisor available from VMWARE® Inc. of Palo Alto, California, United States, utilizes a software-defined virtual Storage Area Network (vSAN) data protection solution that protects data from storage device unavailability discussed above by aggregating storage devices connected to multiple server/host devices via the RAID techniques discussed above, and creating a shared datastore from pools of storage devices that may be accessed by each of the server devices/hosts that are part of a vSAN cluster. However, such vSAN data protection solutions require multiple server devices/hosts (e.g., a minimum of three server devices/hosts are required to provide level 1 RAID (RAID1) data protection, with one acting as a witness and the other two storing data), maintain multiple data backup copies, and are associated with relatively high licensing costs. As such, when the VMWARE®n ESXi hypervisor is utilized with a single server device/host to provide virtual machines that store their data in direct-attached storage devices included in the server device, the vSAN data protection solutions discussed above cannot be used to protect that data. One solution to such issues is the provisioning of a hardware-based RAID data protection solution in the server device that implements hardware-based RAID data protection techniques on data stored by the virtual machines in the storage devices in the server device, but such hardware-based RAID data protection solutions are relatively expensive.

Another solution to such issues is the use of a software RAID data protection solution in the server device like that provided in the Virtual RAID on Central Processing Unit (CPU) (VROC) data protection solution available in CPUs provided by INTEL® corporation of Santa Clara, California, United States. However, the VROC data protection solution discussed above is relatively limited in that it is only provided with INTEL® CPUs, may only be utilized with Non-Volatile Memory express (NVMe) storage devices, only provides RAID1 data protection, and requires Volume Management Device (VMD) hardware in the CPU. As such, the VROC data protection solutions discussed above do not operate with some types of storage devices (e.g., Serial Attached Small Computer System Interface (SCSI) (SAS) storage devices, Serial AT Attachment (SATA) storage devices, etc.) or some types of CPUs (e.g., CPUs available from Advance Micro Devices (AMD) of Santa Clara, California, United States). Furthermore, the VROC data protection solutions discussed above are also associated with relatively high licensing costs.

The inventors of the present disclosure have developed a direct-attached storage device software RAID system that allows software RAIDs to be provided using any types of direct-attached storage devices and any types of CPUs in a computing device, and that direct-attached storage device software RAID system is described in U.S. patent application Ser. No. 18/227,914, filed Jul. 29, 2023, the disclosure of which is incorporated herein by reference in its entirety. As described in that patent document, that direct-attached storage device software RAID system includes a software RAID subsystem that presents a single, primary controller device to a hypervisor subsystem as being connected to a logical storage device provided by a plurality of physical storage devices, receives commands from the hypervisor subsystem that are directed to the primary controller device and that identify a logical storage subsystem that is included in the logical storage device, and transmits those commands to a subset of the physical storage devices that provide that logical storage subsystem via respective controller device(s) that couple the software RAID subsystem to that subset of physical storage devices. However, the inventors of the present disclosure have recognized that the use of a software RAID system to protect data in some server device configurations will raise issues.

For example, some server devices may be configured to operate as virtual Storage Area Network (vSAN) nodes that provide data storage in a vSAN system such as those available from VMWARE® Inc. of Palo Alto, California, United States. As will be appreciated by one of skill in the art in possession of the present disclosure, vSAN systems may provide for the protection of data stored on its storage devices using a minimum of three hosts (i.e., two "data storage" hosts and a "witness" host) provided by the server devices/vSAN nodes. However, such vSAN data protection does not extend to "boot" data or other initialization data stored on storage devices in any of the hosts (i.e., boot data stored in a boot Logical Unit Number (LUN) provided by those storage devices).

Furthermore, such conventional vSAN systems do not allow storage devices providing for the storage of the boot data (i.e., "boot storage") and storage devices providing for the storage of vSAN data (i.e., "vSAN storage") to be connected to the same controller (i.e., conventional vSAN systems require separate commands for the boot storage and the vSAN storage). As such, conventional vSAN systems are associated with relatively high costs due to the need to provide a separate storage controller (e.g., Advanced Host Controller Interface (AHCI) storage controllers, Host Bus Adapter (HBA) storage controllers, etc.) for each the boot storage and the vSAN storage, do not provide for protection of the boot data stored in the boot storage (which will result in unavailability of the host in the event of any unavailability of the boot storage), and will experience issues when utilized with the direct-attached storage device software RAID system discussed above if storage devices providing the boot storage and the vSAN storage are connected to the same controller.

Conventional solutions to such issues include providing a dedicated hardware RAID controller (e.g., a Boot Optimized Storage Solution (BOSS) RAID controller available from DELL® Inc. of Round Rock, Texas, United States) connected to the storage devices that provide the boot storage in order to protect the boot data (with storage devices connected via a backplane and one or more storage controllers used to provide vSAN storage). However, the need to provide a dedicated hardware RAID controller increases the costs of the vSAN system, and is not available in the direct-attached storage device software RAID system discussed above.

Accordingly, it would be desirable to provide a RAID-protected boot data vSAN system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a software Redundant Array of Independent Disk (RAID) engine that is configured to: designate, from a plurality of controller devices, a RAID controller device and a virtual Storage Area Network (vSAN) controller device; configure a first subset of a plurality of storage devices that are coupled to the processing system for boot storage and a second subset of the plurality of storage devices for vSAN storage; provide a RAID path from the RAID controller device to the boot storage provided by the first subset of the plurality of storage devices; provide a vSAN path from the vSAN controller device to the vSAN storage provided by the second subset of the plurality of storage devices; route boot storage commands along the RAID path; and route vSAN storage commands along the vSAN path.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
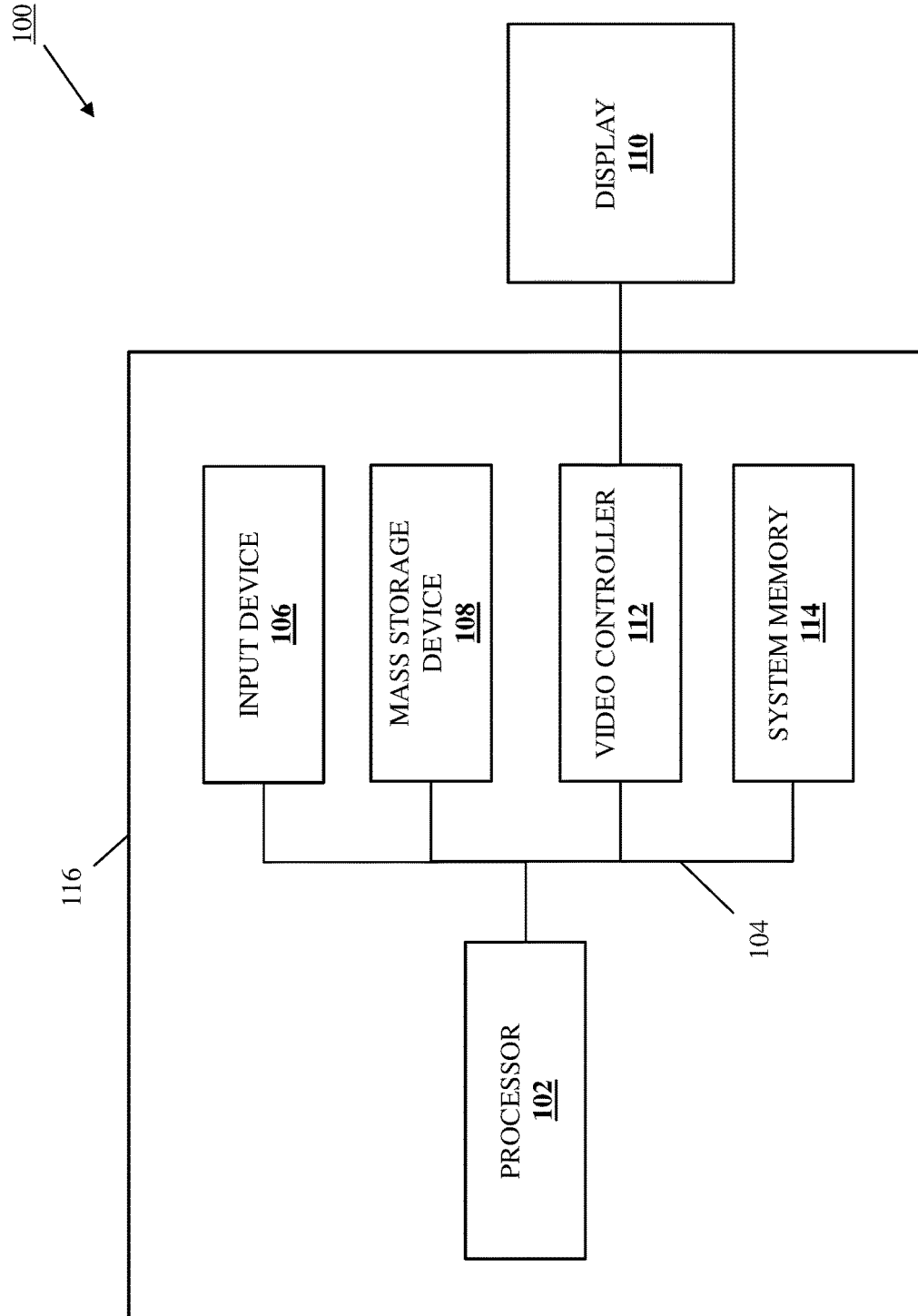
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
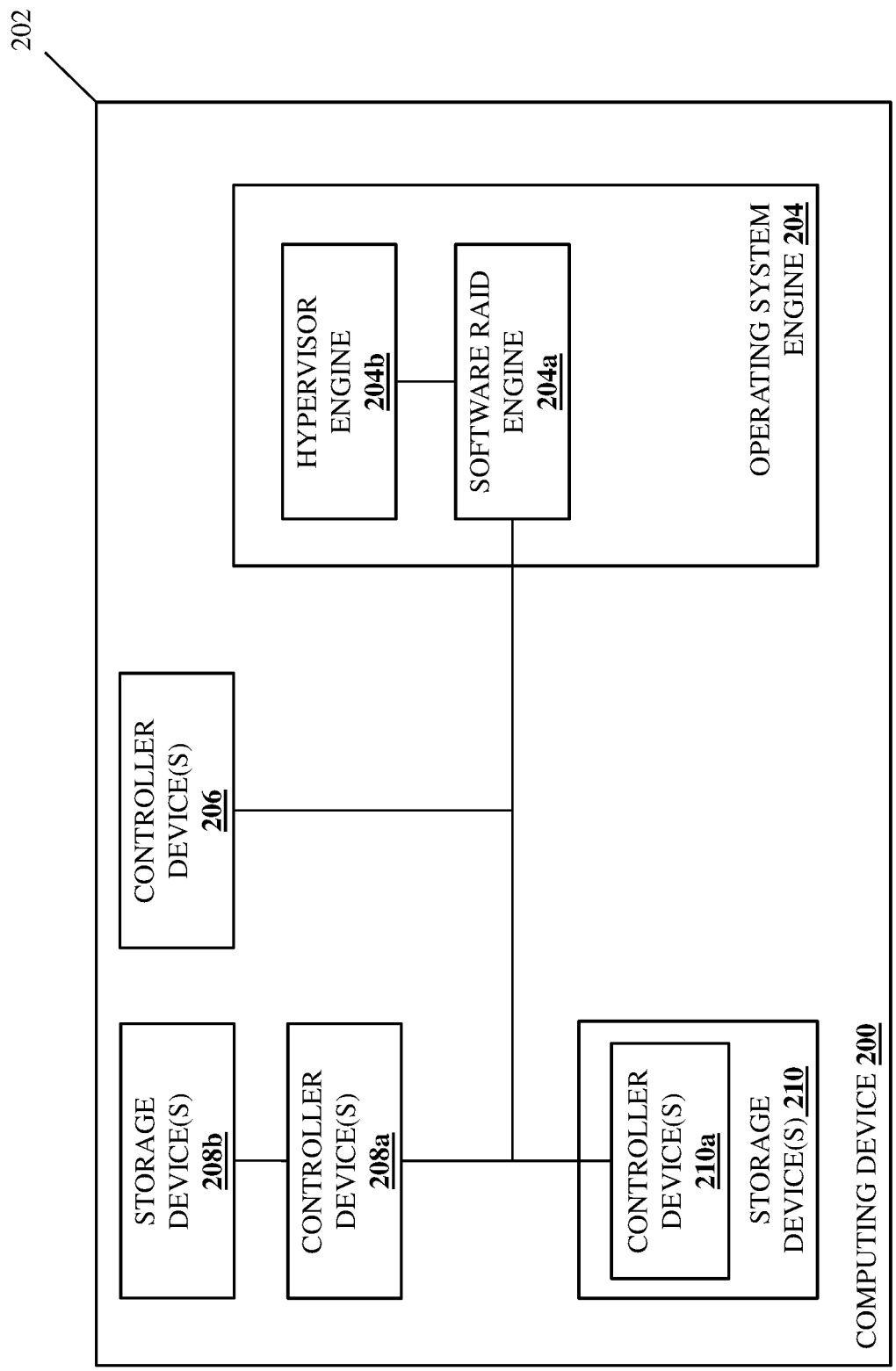
FIG. 2 is a schematic view illustrating an embodiment of a computing device that may include the direct-attached storage device software RAID system of the present disclosure.

Referring now to FIG. 2, an embodiment of a computing device 200 is illustrated that may include the direct-attached storage device software RAID system of the present disclosure. In an embodiment, the computing device 200 may be provided by the IHS 100 discussed above with reference to FIG. 1 and/or may include some or all of the components of the IHS 100, and in specific examples may be provided by a server device. However, while illustrated and discussed as being provided by a server device, one of skill in the art in possession of the present disclosure will recognize that the functionality of the computing device 200 discussed below may be provided by other devices that are configured to operate similarly as the computing device 200 discussed below. In the illustrated embodiment, the computing device 200 includes a chassis 202 that houses the components of the computing device 200, only some of which are illustrated and described below.

For example, the chassis 202 may house a processing system (not illustrated, but which may include the processor 102 discussed above with reference to FIG. 1 such as a Central Processing Unit (CPU)) and a memory system (not illustrated, but which may include the memory 114 discussed above with reference to FIG. 1 such as Dynamic Random Access Memory (DRAM)) that is coupled to the processing system and that includes instructions that, when executed by the processing system, cause the processing system to provide an operating system engine 204 that is configured to provide an operating system and/or otherwise perform the functionality of the operating system engines, and/or computing devices discussed below. In the illustrated embodiment, the memory system may also include instructions that, when executed by the processing system, cause the processing system to provide a software RAID engine 204*a* that is configured to perform the functionality of the software RAID engines, software RAID subsystems, and/or computing devices discussed below.

To provide a specific example, the software RAID engine 204*a* may include a software RAID driver that is configured to utilize hardware resources in the computing device (e.g., the CPU, memory, etc.) in order to create and manage RAID infrastructure and/or perform any of a variety of RAID operations known in the art without the need for dedicated/specialized RAID hardware (e.g., a dedicated hardware RAID controller). However, while the software RAID engine 204*a* is illustrated and described as being included in the operating system and/or otherwise being provided by the operating system engine 204 (i.e., being provided by the processing/memory system combination that also provides the operating system engine 204), one of skill in the art in possession of the present disclosure will appreciate how the software RAID engine 204*a* may be provided separately from the operating system/operating system engine 204 while remaining within the scope of the present disclosure as well.

In an embodiment, the software RAID driver in the software RAID engine 204*a* will include a Small Computer System Interface (SCSI)-based driver, and one of skill in the art in possession of the present disclosure will appreciate how such a SCSI-compliant driver may be configured to be utilized with any PCIe devices/PCIe controller devices (e.g., Advanced Host Controller Interface (AHCI) controllers, SAS controllers, virtual PCIe controllers, NVMe controllers, etc.), thus allowing a computing device manufacturer to provide a single SCSI-based software RAID driver on a plurality of different computing device configurations of computing devices manufactured by the computing device manufacturer in order to enable the software RAID functionality described below in any of those computing devices using the PCIe devices/PCIe controller devices included in those computing devices. To provide a specific example, the software RAID driver in the software RAID engine 204a may be implemented using the native model of the VMWARE®n ESXi hypervisor available from VMWARE® Inc. of Palo Alto, California, United States, although other software RAID driver configurations will fall within the scope of the present disclosure as well.

In the illustrated embodiment, the memory system may also include instructions that, when executed by the processing system, cause the processing system to provide a hypervisor engine 204b that is configured to create and provide the virtual machines described below using the hardware resources in the computing device 200, and/or perform any of the other functionality of the hypervisor engines, hypervisor subsystems, and/or computing devices discussed below. For example, the hypervisor engine 204b may be configured to provide a VMWARE®n ESXi hypervisor available from VMWARE® Inc. of Palo Alto, California, United States, although other hypervisors are envisioned as falling within the scope of the present disclosure as well. As such, the hypervisor engine 204b may include a VMKernal that is available in the VMWARE®n ESXi hypervisor discussed above and that may provide any of the functionality of the hypervisor engine 204b described below. However, while the hypervisor engine 204b is illustrated and described as being included in the operating system and/or otherwise being provided by the operating system engine 204 (i.e., being provided by the processing/memory system combination that also provides the operating system engine 204), one of skill in the art in possession of the present disclosure will appreciate how the hypervisor engine 204b may be provided separately from the operating system/operating system engine 204 while remaining within the scope of the present disclosure as well.

In the illustrated embodiment, the chassis 202 also houses one or more controller devices 206 that are coupled to the software RAID engine 204a (e.g., via a coupling between the controller device(s) 206 and the processing system that provides the software RAID engine 204a). As discussed in the specific examples provided below, the controller device(s) 206 may be provided by Peripheral Component Interconnect express (PCIe) controller devices that may be included in and/or coupled to PCIe devices that are not provided by storage devices. For example, the PCIe controller device(s) 206 may be physical or virtual PCIe controller devices and may be included in Host Bus Adapter (HBA) devices, Advanced Host Controller Interface (AHCI) devices, and/or other PCIe devices that would be apparent to one of skill in the art in possession of the present disclosure. However, while illustrated and described as being provided by PCIe controller device(s), one of skill in the art in possession of the present disclosure will appreciate how the controller device(s) 206 may be provided by other types of controller devices while remaining within the scope of the present disclosure as well.

In the illustrated embodiment, the chassis 202 also houses one or more controller devices 208a that are coupled to the software RAID engine 204a (e.g., via a coupling between the controller device(s) 208a and the processing system that provides the software RAID engine 204a). As illustrated and discussed in the specific examples provided below, the controller device(s) 208a may be provided by Peripheral Component Interconnect express (PCIe) storage controller devices that are coupled to one or more storage devices 208b that may be provided by any of Non-Volatile Memory express (NVMe) storage devices, Serial Attached Small Computer System Interface (SCSI) (SAS) storage device, Serial AT Attachment (SATA) storage devices, and/or other storage devices that would be apparent to one of skill in the art in possession of the present disclosure. For example, the PCIe storage controller device(s) 208a may be provided by physical or virtual PCIe storage controller devices and may include PCIe storage controller devices configured as NVMe storage controllers, SAS storage controllers, SATA storage controllers, and/or other PCIe storage controller devices that would be apparent to one of skill in the art in possession of the present disclosure. However, while illustrated and described as being provided by PCIe controller device(s), one of skill in the art in possession of the present disclosure will appreciate how the controller device(s) 208a may be provided by other types of controller devices while remaining within the scope of the present disclosure as well.

In the illustrated embodiment, the chassis 202 also houses one or more controller devices 210a that are coupled to the software RAID engine 204a (e.g., via a coupling between the controller device(s) 208a and the processing system that provides the software RAID engine 204a). As illustrated and discussed in the specific examples provided below, the controller device(s) 210a may be provided by Peripheral Component Interconnect express (PCIe) controller devices that are included in one or more storage devices 210 that may be provided by any of Non-Volatile Memory express (NVMe) storage devices, Serial Attached Small Computer System Interface (SCSI) (SAS) storage device, Serial AT Attachment (SATA) storage devices, and/or other storage devices that would be apparent to one of skill in the art in possession of the present disclosure. For example, the PCIe storage controller device(s) 210a may be provided by physical or virtual PCIe storage controller devices and may include PCIe storage controller devices configured as NVMe storage controllers. However, while illustrated and described as being provided by PCIe controller device(s), one of skill in the art in possession of the present disclosure will appreciate how the controller device(s) 210a may be provided by other types of controller devices while remaining within the scope of the present disclosure as well.

However, while three different embodiments of controller devices 206, 208a, and 210a are illustrated and described as being included in the computing device 200 (e.g., stand-alone controller device(s), storage-device-connected controller device(s), and storage-device-integrated controller device(s)), one of skill in the art in possession of the present disclosure will appreciate how one or more of the controller devices 206, 208a, and/or 210a may be omitted from the computing device 200 while remaining within the scope of the present disclosure as well. Furthermore, while not explicitly illustrated, one of skill in the art in possession of the present disclosure will appreciate how any of the controller devices 208a and/or 210a may be coupled to and/or may control multiple storage devices 208b and/or 210, respectively, while remaining within the scope of the present disclosure as well.

Further still, one of skill in the art in possession of the present disclosure will appreciate how storage devices may be coupled to the software RAID engine 204a via multiple controller devices (e.g., when an NVMe storage device with an integrated controller device is connected via an external controller device to the software RAID engine 204a). As such, while a specific computing device 200 has been illustrated and described, one of skill in the art in possession of the present disclosure will recognize that computing devices (or other devices operating according to the teachings of the present disclosure in a manner similar to that described below for the computing device 200) may include a variety of components and/or component configurations for providing conventional computing device functionality, as well as the direct-attached storage device software RAID functionality discussed below, while remaining within the scope of the present disclosure as well.

For example, one of skill in the art in possession of the present disclosure will appreciate how the present disclosure describes the direct-attached storage device software RAID system of the present disclosure implemented to operate with hypervisor subsystem such as the VMWARE® ESXi hypervisor subsystem described above. However, the inventors of the present disclosure have also developed a direct-attached storage device software RAID system may be implemented with an operating system (i.e., rather than a hypervisor subsystem) in order to allow software RAIDs to be provided using any types of direct-attached storage devices and any types of CPUs in a computing device similarly as described below, and that direct-attached storage device software RAID system is described in U.S. patent application Ser. No. 18/228,006, filed Jul. 31, 2023, the disclosure of which is incorporated herein by reference in its entirety.

Figure 3:
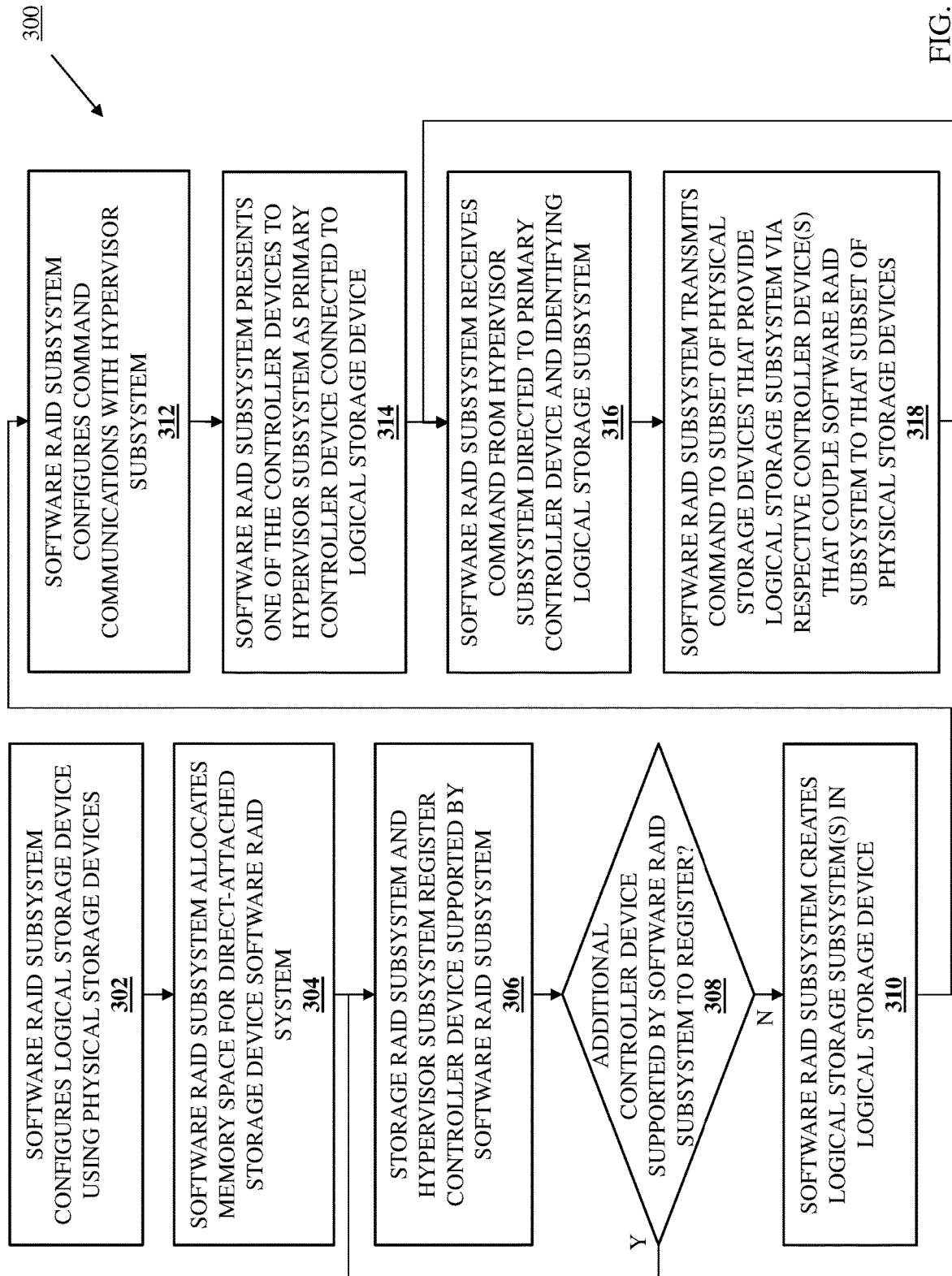
FIG. 3 is a flow chart illustrating an embodiment of a method for providing a software RAID using direct-attached storage devices in a computing device.

Referring now to FIG. 3, an embodiment of a method 300 for providing a software Redundant Array of Independent Disk (RAID) using direct-attached storage devices in a computing device is illustrated. As discussed below, the systems and methods of the present disclosure provide for the presentation by a software RAID subsystem to a hypervisor subsystem of a single, primary controller device as being connected to a logical storage device provided by a plurality of physical storage devices, with the software RAID subsystem receiving commands from the hypervisor subsystem that are directed to the primary controller device and that identify a logical storage subsystem that is included in the logical storage device, and transmitting those commands to a subset of the physical storage devices that provide that logical storage subsystem via respective controller device(s) that couple the software RAID subsystem to that subset of physical storage devices.

For example, the direct-attached storage device software RAID system of the present disclosure may include a chassis housing a software RAID subsystem coupled to physical storage devices, controller devices, and a hypervisor subsystem housed in the chassis. The software RAID subsystem uses the physical storage devices to provide a logical storage device to the hypervisor subsystem. The software RAID subsystem also presents a first controller device to the hypervisor subsystem as a primary controller device that is connected to the logical storage device. When the software RAID subsystem receives a command from the hypervisor subsystem directed to the primary controller device and identifying a logical storage subsystem in the logical storage device, it transmits the command to each of a subset of the physical storage devices that provide the logical storage subsystem in the logical storage device via a respective one of the controller devices that couples the software RAID subsystem to that physical storage device. As such, software RAIDs may be provided using any types of direct-attached storage devices and any types of CPUs in a computing device, as well as provide a variety of other benefits that would be apparent to one of skill in the art in possession of the present disclosure.

Figure 4:
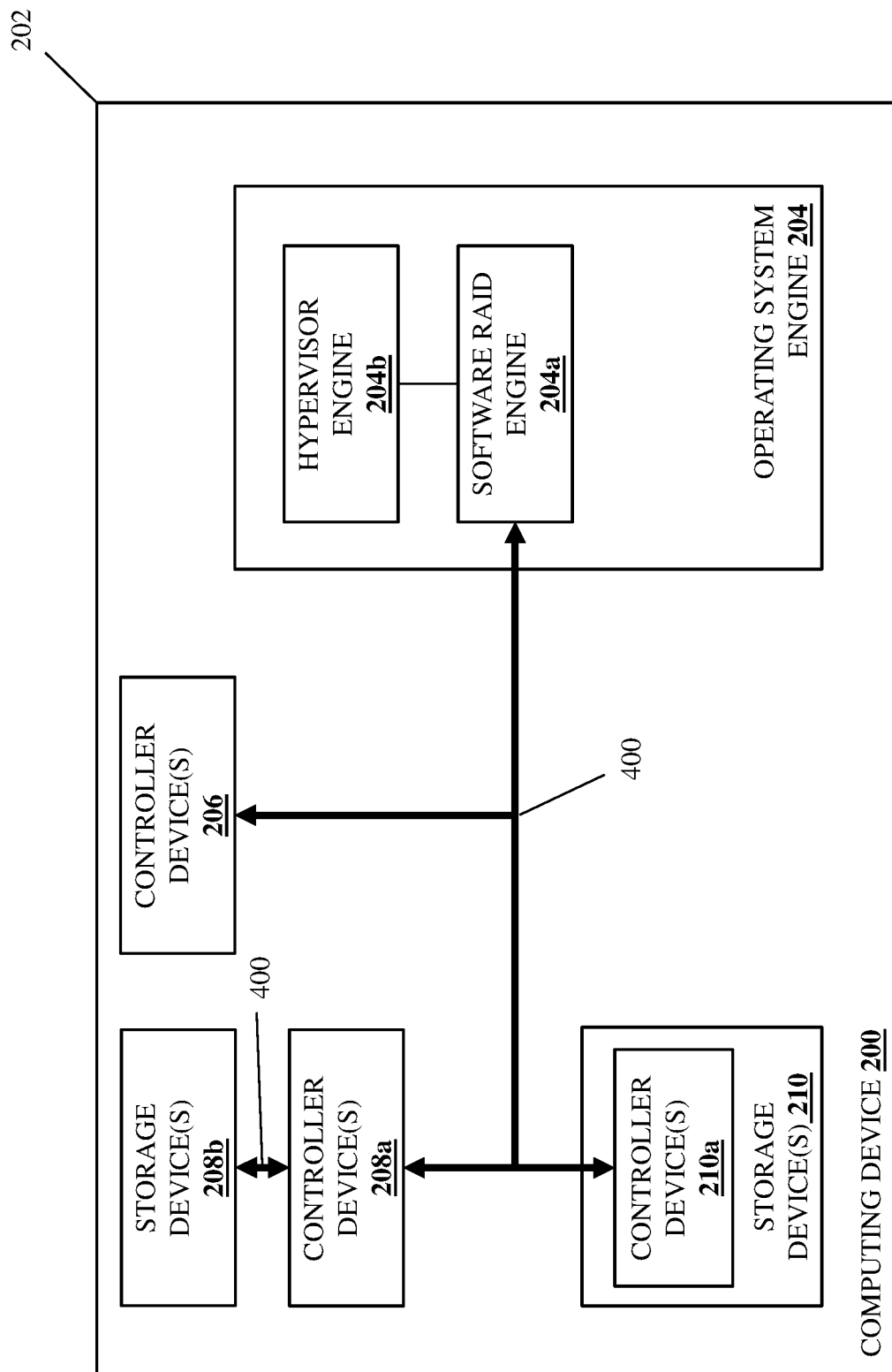
FIG. 4 is a schematic view illustrating an embodiment of the operation of the computing device of FIG. 2 during the method of FIG. 3.

The method 300 begins at block 302 where a software RAID subsystem configures a logical storage device using physical storage devices. With reference to FIG. 4, in an embodiment of block 302, the software RAID engine 204a in the computing device 200 may perform logical storage device configuration operations 400 that may include discovering each of the controller devices 206, 208a, and 210a and, in response, discovering each of the storage devices 208b and/or 210 coupled thereto, and then configuring a logical storage device using those storage devices 208b and/or 210. In a specific example, each of the storage device(s) 208a may be coupled to a PCIe controller device that is provided by one of the controller device(s) 208a discovered at block 302, and each of the storage device(s) 210 may include a PCIe controller device that is provided by one of the controller device(s) 210a discovered at block 302, while PCIe controller device(s) that are provided by the controller device(s) 206 and that are not coupled to storage devices may be discovered at block 302 as well.

For example, in response to the powering on, reset, reboot, and/or other initialization of the computing device 200, the computing device 200 may enter a pre-boot mode in which the software RAID engine 204a performs any of a variety of software RAID operations and/or other techniques that would be apparent to one of skill in the art in possession of the present disclosure in order to configure a RAID using the storage devices 208a and 210 that allows the software RAID engine 204a to present those storage devices 208a and 210 as one or more logical storage devices. As will be appreciated by one of skill in the art in possession of the present disclosure, the RAID maybe configured using the storage devices 208a and 210 with a variety of standard RAID levels such as a RAID0, RAID1, RAID2, RAID3, RAID4, RAID5, or RAID 6, as well as combinations of standard RAID levels (e.g., RAID 1+0, also known as RAID10), non-standard RAID levels, and/or any other RAID levels that would be apparent to one of skill in the art in possession of the present disclosure.

The method 300 then proceeds to block 304 where the software RAID subsystem allocates memory space for a direct-attached storage device software RAID system. In an embodiment, at block 304, the software RAID engine 204a in the computing device 200 may perform memory space allocation operations that may include allocating memory space for use by the direct-attached storage device software RAID system of the present disclosure. For example, the memory space allocation operations performed by the software RAID engine 204a may include allocating a memory space or other portion of the memory system that is used to provide the operating system engine 204 (e.g., operating system kernel memory) for use by the software RAID engine 204a to perform any of the direct-attached storage device software RAID operations or other functionality discussed below. As will be appreciated by one of skill in the art in possession of the present disclosure, the memory space or other portion of the memory system allocated for use by the direct-attached storage device software RAID system may be referred to a "heap memory" that may be dynamically allocated to the software RAID driver provided by the software RAID engine 204a (e.g., unlike memory space allocated to stacks), and one of skill in the art in possession of the present disclosure will recognize how the heap memory may be utilized to perform any of the functionality described below.

In a specific example, the allocation of the heap memory to the software RAID engine 204a may be performed during module initialization operations that are performed when an operating system provided by the operating system engine 204 is loaded and calls those module initialization operations, and the software RAID engine 204a may allocate the heap memory based on a number of storage devices (e.g., a maximum number of storage devices) that the software RAID engine 204a is configured to support. However, while a specific example of the allocation of memory space for use by the direct-attached storage device software RAID system of the present disclosure has been described, one of skill in the art in possession of the present disclosure will appreciate how memory space may be allocated for use by the direct-attached storage device software RAID system using a variety of techniques that will fall within the scope of the present disclosure as well.

Figure 5:
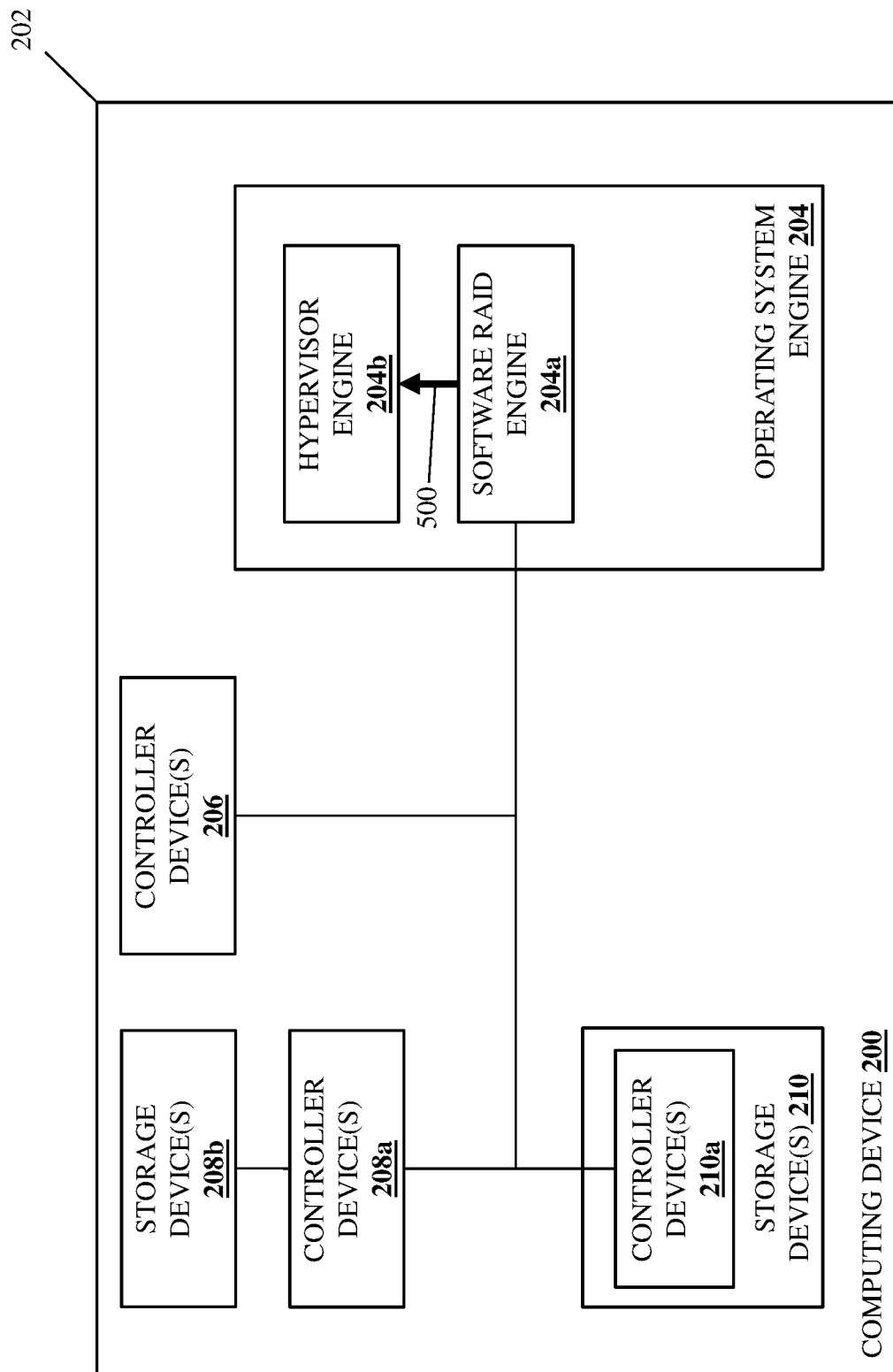
FIG. 5 is a schematic view illustrating an embodiment of the operation of the computing device of FIG. 2 during the method of FIG. 3.

The method 300 then proceeds to block 306 where the software RAID subsystem and the hypervisor subsystem register a controller device supported by the software RAID subsystem. With reference to FIG. 5, in an embodiment of block 306, the controller device registration operations may include the software RAID engine 204a in the computing device 200 performing supported controller device identification operations 500 that may include identifying controller devices that are supported by the software RAID engine 204a to the hypervisor engine 204b in the computing device 200. For example, any of the controller devices 206, 208a, and/or 210a discovered at block 302 as discussed above may be identified to the hypervisor engine 204b as supported controller devices at block 306. In a specific example, at block 306, the software RAID engine 204a may generate a Peripheral Component Interconnect (PCI) IDentification (PCIID) file that identifies the PCIe controller devices that are supported by the software RAID engine 204a, and may load or otherwise transmit that PCIID file to the hypervisor engine 204b. However, while a specific example of the identification of controller devices to the hypervisor engine 204b that are supported by the software RAID engine 204a has been described, one of skill in the art in possession of the present disclosure will appreciate how the software RAID engine 204a may identify supported controller devices to the hypervisor engine 204b using other techniques that will fall within the scope of the present disclosure as well.

Figure 6A:
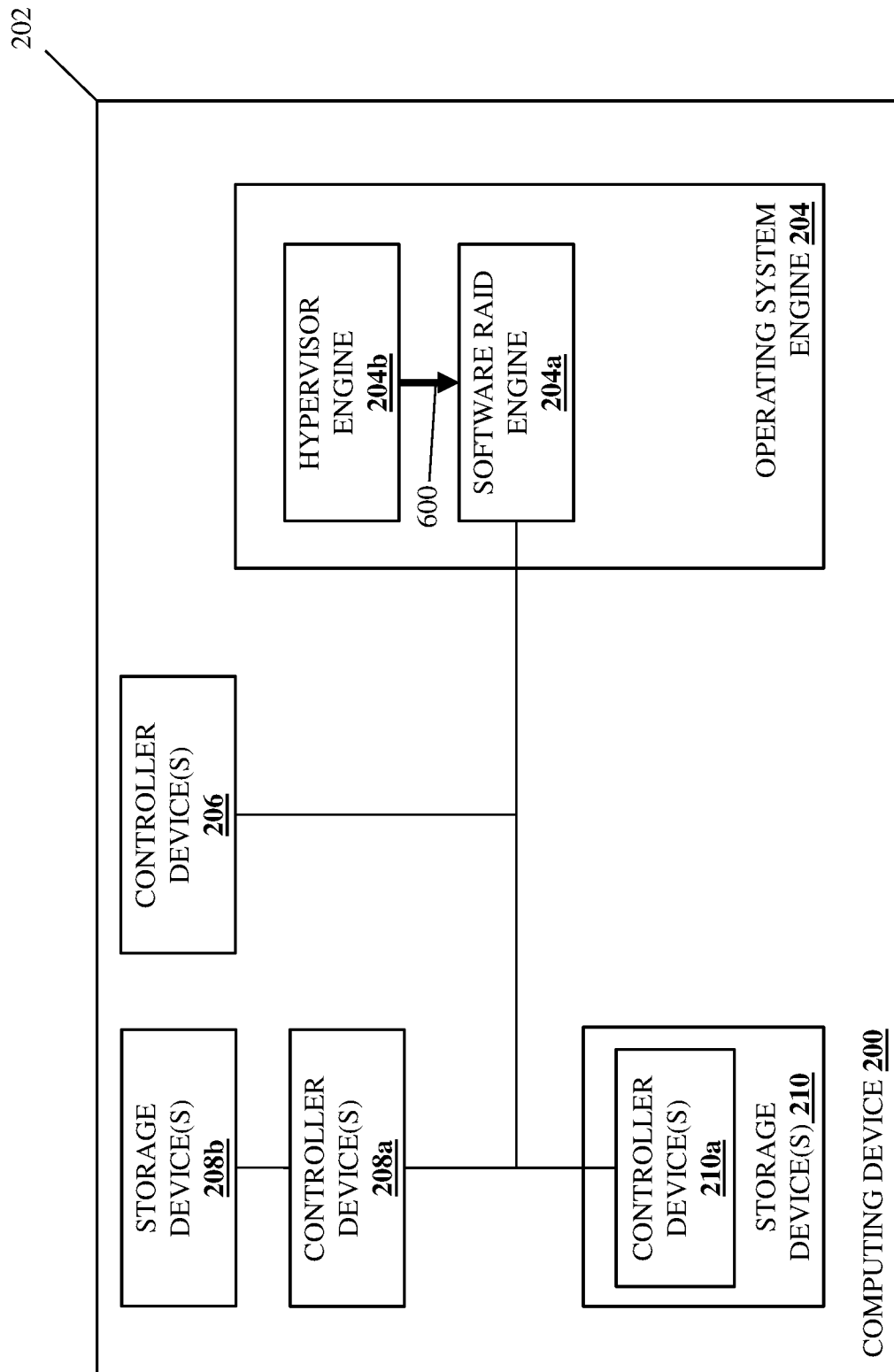
FIG. 6A is a schematic view illustrating an embodiment of the operation of the computing device of FIG. 2 during the method of FIG. 3.

With reference to FIG. 6A, in an embodiment of block 306, the controller device registration operations may also include the hypervisor engine 204b in the computing device 200 performing controller device attachment request operations 600 that may include the hypervisor engine 204b generating and transmitting a controller device attachment request for one of the controller devices that was identified as being supported by the software RAID engine 204a. For example, a VMkernal in the VMWARE®n ESXi hypervisor described above that provides the hypervisor engine 204b may generate and transmit an "AttachDevice" ESXi call that provides the controller device attachment request and that one of skill in the art in possession of the present disclosure will recognize provides an instruction to the software RAID engine to initialize and discover one of the controller devices that was identified as being supported via a SCSI transport layer. However, while a specific example of a controller device attachment request has been described, one of skill in the art in possession of the present disclosure will appreciate how the hypervisor engine 204b may request the initialization and discovery of controller devices using other techniques that will fall within the scope of the present disclosure as well.

Figure 6B:
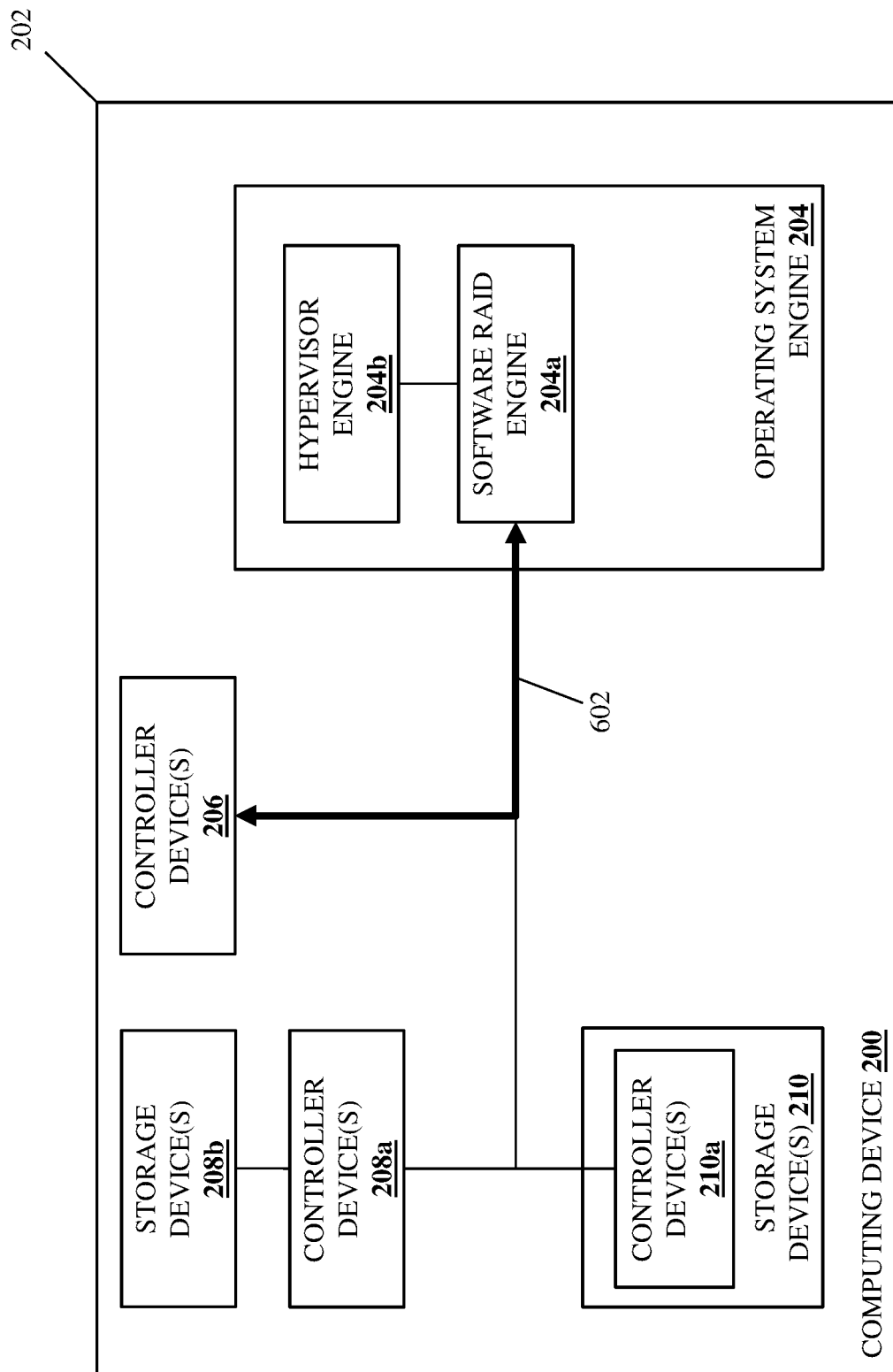
FIG. 6B is a schematic view illustrating an embodiment of the operation of the computing device of FIG. 2 during the method of FIG. 3.

With reference to FIG. 6B, in an embodiment of block 306 and in response to receiving the controller device attachment request from the hypervisor engine 204b, the controller device registration operations may also include the software RAID engine 204a in the computing device 200 performing initialization and discovery operations 602 that may include the software RAID engine 204a initializing and discovering, in the specific example provided in FIG. 6B, the one of the controller device(s) 206 identified by the hypervisor engine 204b in the controller device attachment request. As will be appreciated by one of skill in the art in possession of the present disclosure, the initialization and discovery operations 602 performed by the software RAID engine 204a may include any of a variety of initialization operations and discovery operations that would be apparent to one of skill in the art in possession of the present disclosure, and may depend on the protocol supported by that controller device (e.g., a SAS protocol, a SATA protocol, an NVMe protocol, etc.).

In some embodiments, following the initialization and discovery of the first controller device during the first iteration of block 306, the software RAID engine 204a in the computing device 200 may perform timer registration operations that may include registering a timer with the hypervisor engine 204b. As discussed below, some embodiments of the present disclosure may include the utilization of a timer to determine when the last controller device has been registered as part of the controller device registration operations performed across one or more iterations of block 306 of the method 300, and thus that timer may be registered by the software RAID engine 204a with the hypervisor engine 204b at block 306 using any of a variety of timer registration techniques that would be apparent to one of skill in the art in possession of the present disclosure. However, the registration of the timer is described as occurring at a particular point in method 300 (e.g., following initialization and discovery of the first controller device during the first iteration of block 306), one of skill in the art in possession of the present disclosure will appreciate how the timer may be registered at other points in the method 300 while remaining within the scope of the present disclosure as well. Furthermore, other embodiments of the method 300 may utilize other techniques to determine when the last controller device has been registered as part of the controller device registration operations across one or more iterations of block 306 of the method 300, and thus the timer registration operations may be skipped in those embodiments.

Figure 6C:
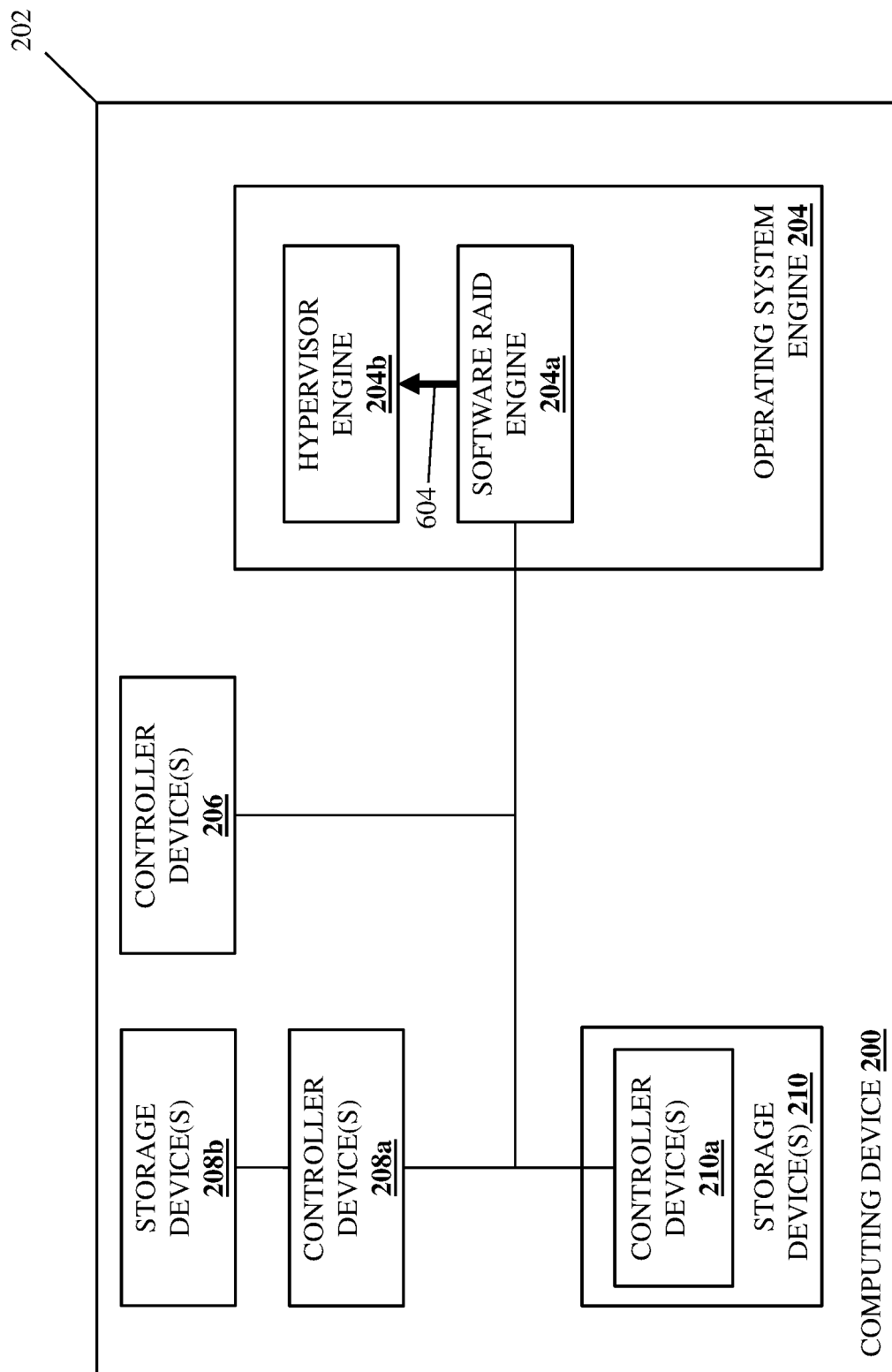
FIG. 6C is a schematic view illustrating an embodiment of the operation of the computing device of FIG. 2 during the method of FIG. 3.

With reference to FIG. 6C, in an embodiment of block 306 and in response to initializing and discovering the one of the controller device(s) 206 in the specific example provided in FIG. 6B, the controller device registration operations may also include the software RAID engine 204a in the computing device 200 performing controller device attachment confirmation operations 604 that may include the software RAID engine 204a confirming the completion of the controller device attachment request that was received from the hypervisor engine 204b for the one of the controller device(s) 206 in the specific example provided in FIG. 6B. For example, in response to the successful initialization and discovery of a connected controller device and its corresponding storage device(s), the software RAID engine 204a may confirm the attachment request to the hypervisor engine 204b. While not illustrated or discussed in detail, one of skill in the art in possession of the present disclosure will appreciate how the software RAID engine 204a may identify to the hypervisor engine 204b any failures of the initialization and discovery of any connected controller devices and its corresponding storage device(s) as well.

Figure 6D:
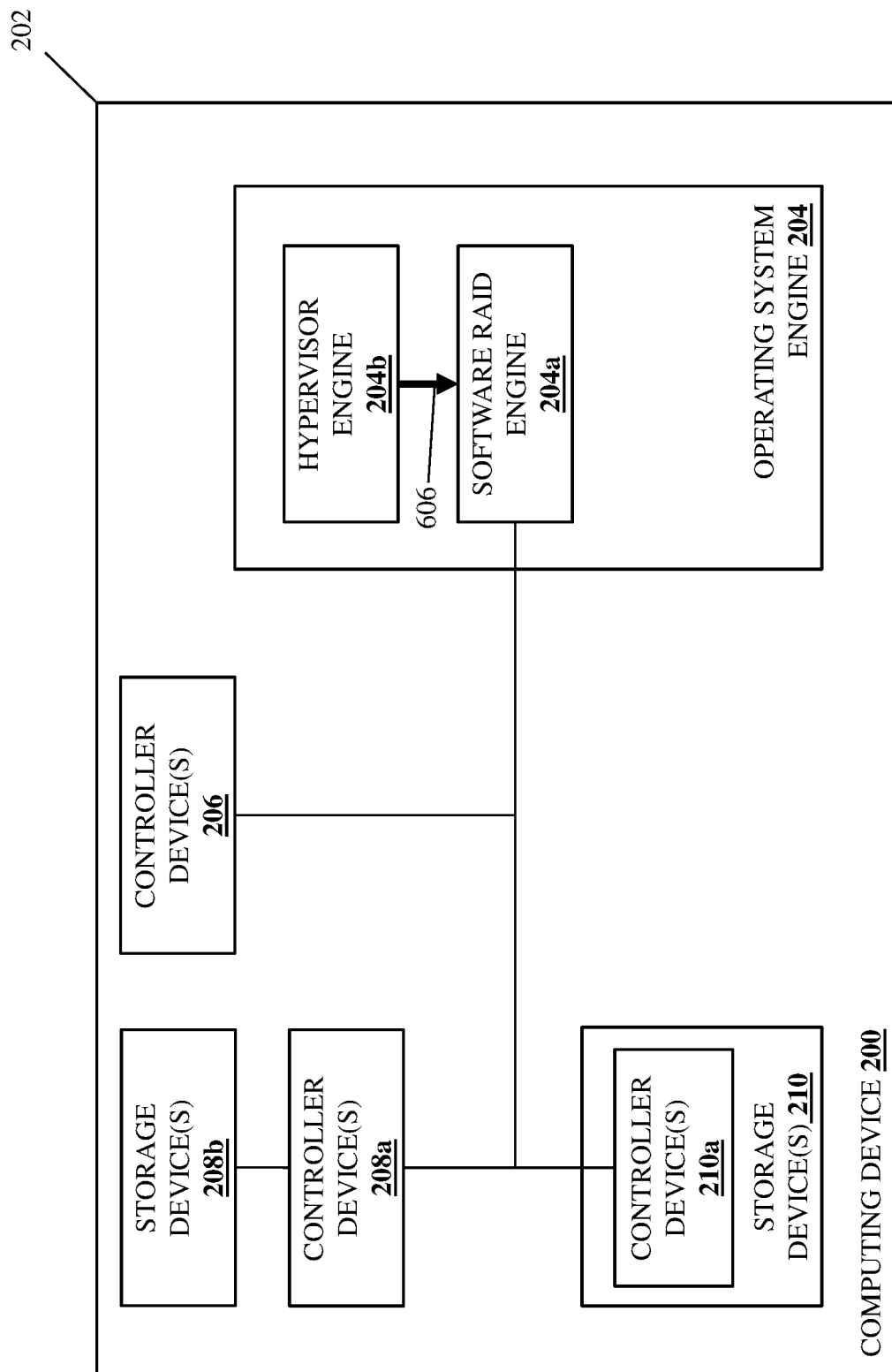
FIG. 6D is a schematic view illustrating an embodiment of the operation of the computing device of FIG. 2 during the method of FIG. 3.

With reference to FIG. 6D, in an embodiment of block 306, the controller device registration operations may also include the hypervisor engine 204b in the computing device 200 performing hypervisor registration request operations 606 that may include the hypervisor engine 204b generating and transmitting a hypervisor registration request to register the one of the controller devices in the specific example provided in FIG. 6B with the hypervisor engine 204b. For example, a VMkernal in the VMWARE®n ESXi hypervisor described above that provides the hypervisor engine 204b may generate and transmit an "ScanDevice" ESXi call that provides the hypervisor registration request and that one of skill in the art in possession of the present disclosure will recognize provides an instruction to the software RAID engine to register the one of the controller devices in the specific example provided in FIG. 6B in the hypervisor engine 204b. However, while a specific example of a hypervisor registration request has been described, one of skill in the art in possession of the present disclosure will appreciate how the hypervisor engine 204b may request the registration of controller devices in the hypervisor engine 204b using other techniques that will fall within the scope of the present disclosure as well.

Figure 6E:
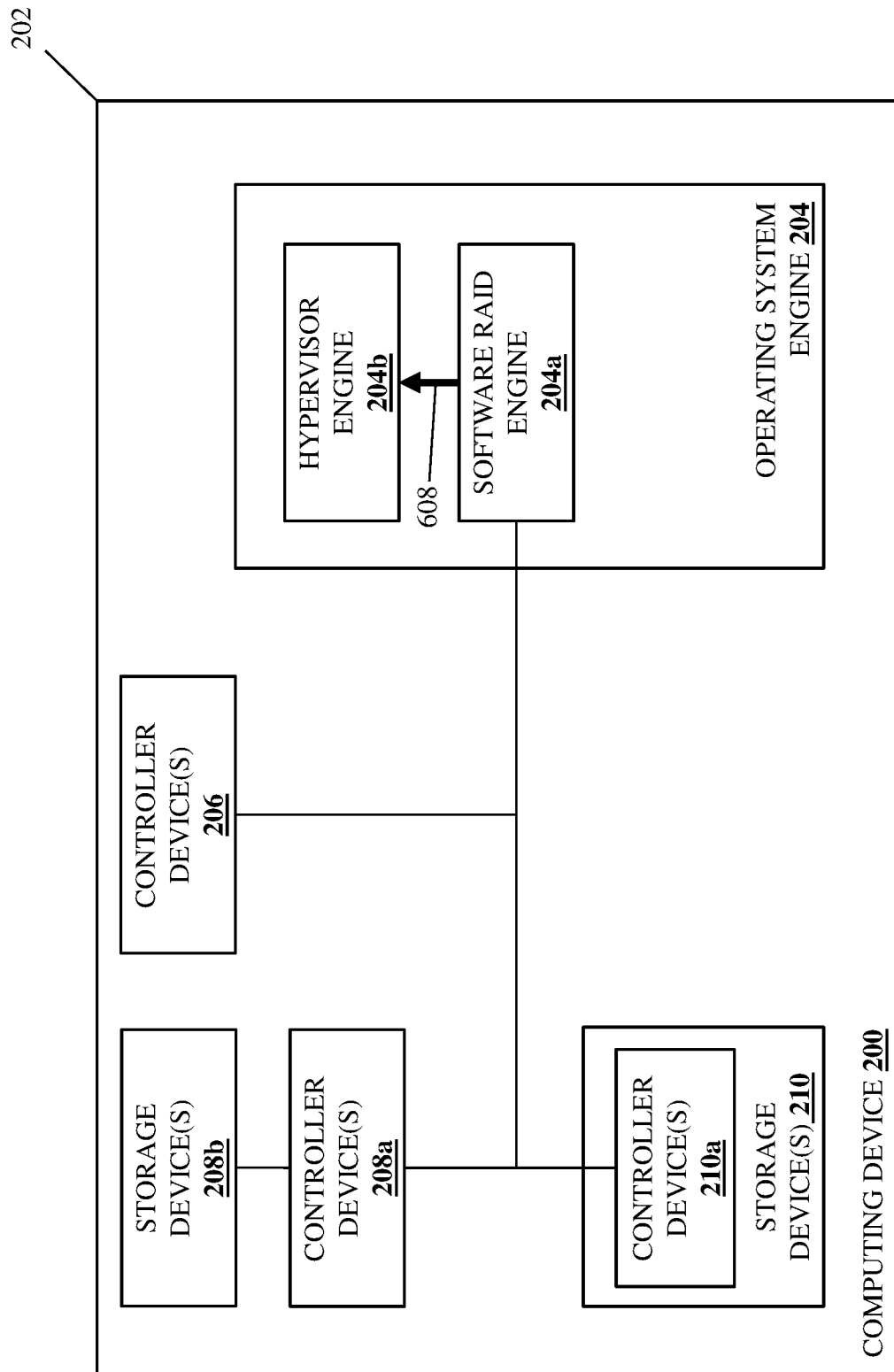
FIG. 6E is a schematic view illustrating an embodiment of the operation of the computing device of FIG. 2 during the method of FIG. 3.

With reference to FIG. 6E, in some embodiments of block 306 and in response to receiving the hypervisor registration request (e.g., the "ScanDevice" ESXi call), the controller device registration operations may also include the software RAID engine 204a in the computing device 200 performing hypervisor registration operations 608 that may include the software RAID engine 204a registering the one of the controller device(s) 206 in the specific example provided in FIG. 6B in the hypervisor engine 204b using any of a variety of hypervisor/controller device registration techniques that would be apparent to one of skill in the art in possession of the present disclosure. For example, in response to a "ScanDevice" ESXi call, the software RAID engine 204a may register the controller device with the hypervisor engine 204b and retrieve a "handle" for use in performing subsequent communications with that controller device, and then enable Input/Output (I/O) commands for the controller device from the hypervisor engine 204b once that registration is completed. However, in other embodiments of block 306 and in response to receiving the hypervisor registration request (e.g., the "ScanDevice" ESXi call), the hypervisor registration operations may instead include the software RAID engine 204a in the computing device 200 "holding", delaying, and/or otherwise waiting to perform the hypervisor registration operations 608 that register the one of the controller device(s) 206 in the specific example provided in FIG. 6B in the hypervisor engine 204b.

The method 300 then proceeds to decision block 308 where it is determined whether there is an additional controller device supported by the software RAID subsystem to register. In some embodiments of decision block 308, following the registration of the one of the controller device(s) 206 in the specific example provided in FIG. 6B in the hypervisor engine 204b at block 306, the software RAID engine 204a in the computing device 200 may perform timer activation operations in order to activate the timer discussed above that may have been registered with the hypervisor engine 204b in some embodiments of the present disclosure. The software RAID engine 204a may then monitor that timer at decision block 308 to determine whether another controller device attachment request (e.g., the "AttachDevice" ESXi call in the specific example provided above) for another of the controller devices 206, 208b, and/or 210a is received from the hypervisor engine 204b within a threshold time period. As will be appreciated by one of skill in the art in possession of the present disclosure, the software RAID engine 204a may utilize any of a variety of threshold time periods that, after which, the software RAID engine 204a may assume that no further controller device attachment requests will be received (i.e., that there are no further controller devices to be registered with the hypervisor engine 204b).

However, while the use of a timer and threshold time period following registration of any particular controller device in order to determine whether there are any other controller devices to register at decision block 308 has been described, as discussed above other techniques for determining whether there are any other controller devices to register at decision block 308 will fall within the scope of the present disclosure as well. For example, other embodiments of the present disclosure may provide a software driver in the computing device 200 that is configured to identify a number of available controller devices in the computing device 200, and then transmit that number of available controller devices to the software RAID engine 204a for use in determining at decision block 308 whether the number of controller devices registered with the hypervisor engine 204a has reached that number of available controller devices. As such, the determination of whether there are any other controller devices to register in the hypervisor engine 204b during decision block 308 of the method 300 may be performed in a variety of manners while remaining within the scope of the present disclosure.

If, at decision block 308, it is determined that there is an additional controller device supported by the software RAID subsystem to register, the method 300 returns to block 306. As such, the method 300 may loop such that the software RAID engine 204a and the hypervisor engine 204b in the computing device 200 operate to register any additional controller device with the hypervisor engine 204b. Thus, different iterations of block 306 and decision block 308 may cause the software RAID engine 204a and the hypervisor engine 204b to register each of the controller devices in the computing device 200 in the hypervisor engine 204b. For example, for any remaining controller devices 206, 208a, and 210a, the controller device attachment request operations 600, initialization and discovery operations 602, controller device attachment confirmation operations 604, hypervisor registration request operations 606, and hypervisor registration operations 608 described above for block 306 may be performed for that controller device, and block 306 may repeat until it is determined that there are no additional controller devices to register with the hypervisor engine 204b.

Figure 7:
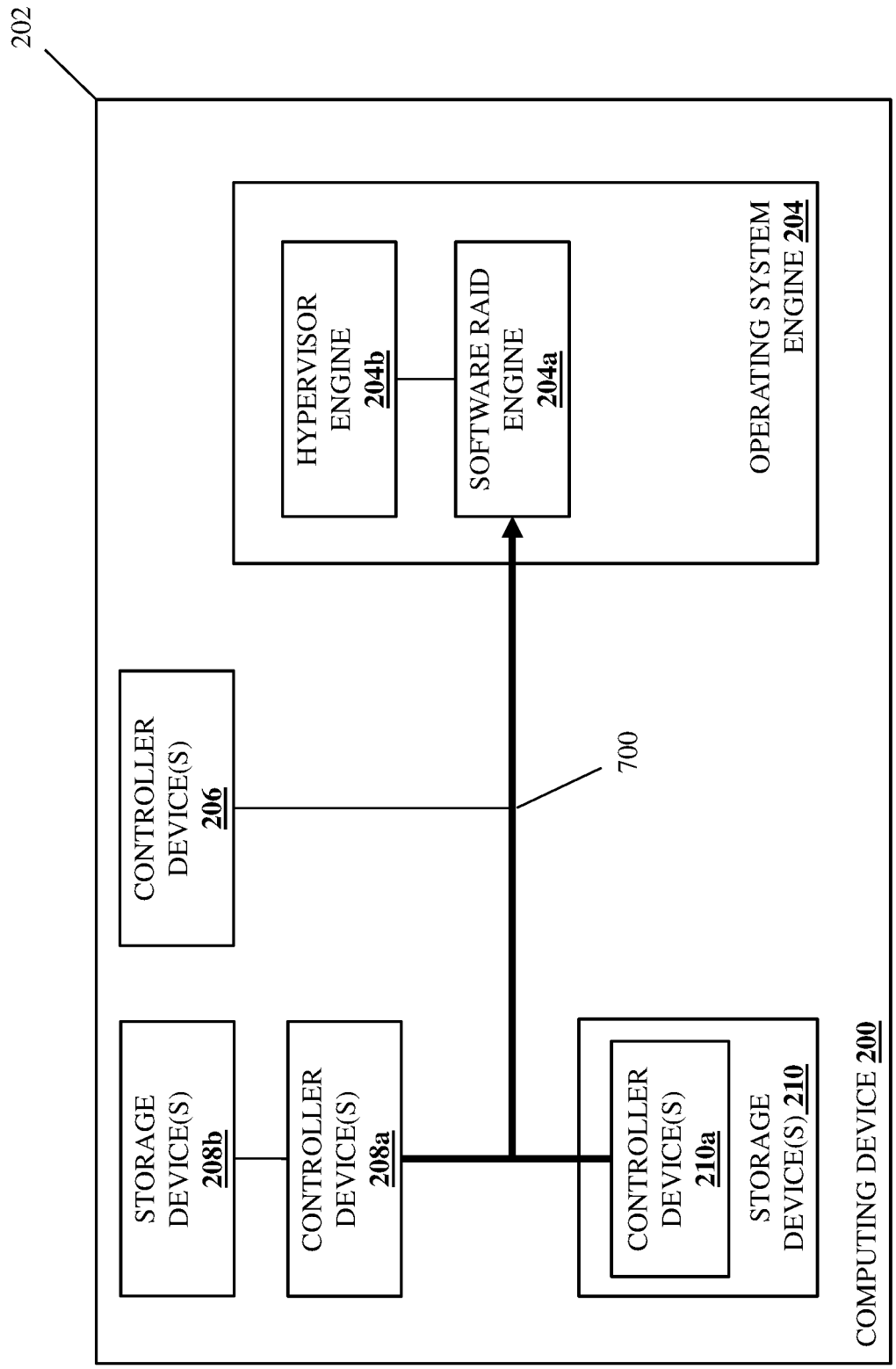
FIG. 7 is a schematic view illustrating an embodiment of the operation of the computing device of FIG. 2 during the method of FIG. 3.

If, at decision block 308, it is determined that there are no additional controller devices supported by the software RAID subsystem to register, the method 300 proceeds to block 310 where the software RAID subsystem creates one or more logical storage subsystems in the logical storage device. In an embodiment, at block 310 and in response to determining that there are no additional controller devices to register with the hypervisor engine 204b, the software RAID engine 204a in the computing device 200 may perform logical storage subsystem creation operations that may include creating one or more logical storage subsystems in the logical storage device provided by the storage devices 208b and 210. For example, with reference to FIG. 7, in some embodiments the logical storage subsystem creation operations may include the software RAID engine 204a performing metadata retrieval operations 700 that may include retrieving metadata from the controller devices 208a and 210a coupled to each of the storage devices 208b and 210 that are being used to provide the logical storage device.

As will be appreciated by one of skill in the art in possession of the present disclosure, the metadata retrieved from the controller devices 208a and 210a coupled to each of the storage devices 208b and 210 may identify one or more logical storage subsystems (e.g., virtual disks, RAID volumes, RAID Logical Unit Numbers (LUNs), and/or logical storage subsystems known in the art) that will be provided by each of the storage devices 208b and 210, as well as any other information that one of skill in the art in possession of the present disclosure would recognize as providing for the creation of the logical storage subsystems in the logical storage device. As such, at block 310, the logical storage subsystem creation operations performed by the software RAID engine 204a may include using the metadata retrieved from the controller devices 208a and 210a coupled to each of the storage devices 208b and 210 to "build", generate, and/or otherwise create one or more logical storage subsystems (e.g., virtual disks, RAID volumes, RAID LUNs, and/or logical storage subsystems known in the art) in the logical storage device that is provided by the storage devices 208b and 210. However, while a specific example of the creation of logical storage subsystem(s) in a logical storage device has been described, one of skill in the art in possession of the present disclosure will appreciate how the logical storage subsystems may be created in the logical storage device using a variety of techniques that will fall within the scope of the present disclosure as well.

Figure 8:
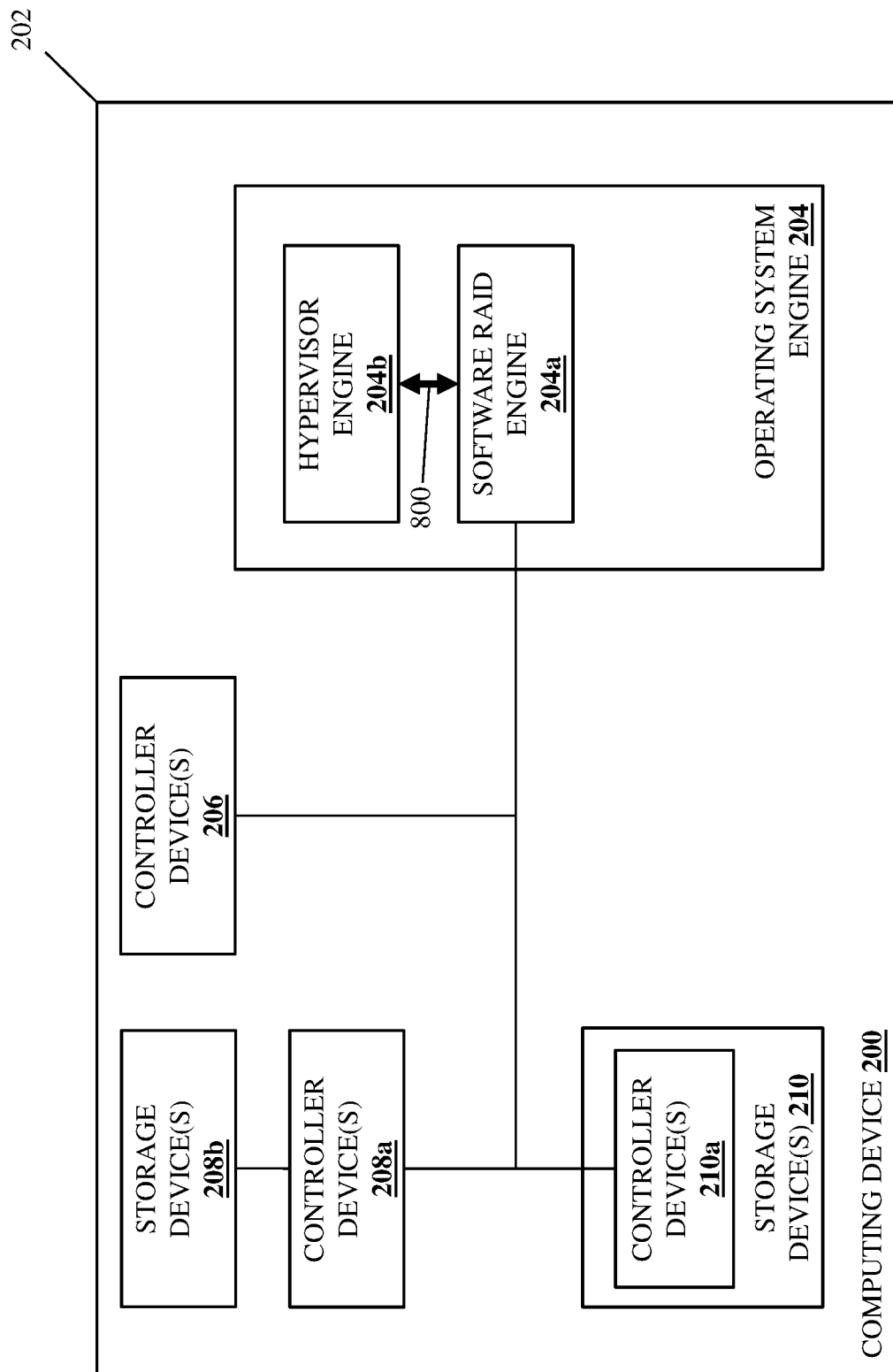
FIG. 8 is a schematic view illustrating an embodiment of the operation of the computing device of FIG. 2 during the method of FIG. 3.

The method 300 then proceeds to block 312 where the software RAID subsystem configures command communications with the hypervisor subsystem. With reference to FIG. 8, in an embodiment of block 312, the software RAID engine 204a in the computing device 200 may perform command communication configuration operations 800 that may include identifying a primary controller device from the plurality of controller devices 206, 208a, and 210a. For example, the controller device 206, 208a, or 210a identified as the primary controller device at block 312 may be a PCIe controller device that may have been designated by a computing device manufacturer to operate as the primary controller device based on that PCIe controller device being common to a variety of different configurations of computing devices provided by the computing device manufacturer (and thus being present in each of those computing devices/computing device configurations if needed to implement the direct-attached storage device software RAID system of the present disclosure). In another example, the controller device 206, 208a, or 210a identified as the primary controller device at block 312 may be a PCIe controller device that is not configured to be "hot removed" from the computing device 200. However, while a few specific examples of controller devices that may be identified as primary controller devices have been described, one of skill in the art in possession of the present disclosure will appreciate how any of a variety of criteria may be used to designate the controller device that may be identified as the primary controller device at block 312 while remaining within the scope of the present disclosure as well.

In a specific example, at block 312, the software RAID engine 204a in the computing device 200 may perform command communication configuration operations that may also include identifying a number of SCSI queues in a SCSI layer of the hypervisor engine 204b that are used by the hypervisor engine 204b to communicate with the software RAID engine 204a, and one of skill in the art in possession of the present disclosure will appreciate how any Input/Output (I/O) commands generated by the hypervisor engine 204b (e.g., the VMKernal discussed above) will be mapped to one of those SCSI queues. Furthermore, the SCSI queues may be mapped to SAS, SATA, and/or NVMe protocol queues in the software RAID engine 204a so that I/O commands generated by the hypervisor engine 204b may be transmitted to the storage devices 208b and 210. As will be appreciated by one of skill in the art in possession of the present disclosure, the allocation of SCSI queues is typically dependent on the number of processing cores available in the processing system that provides the hypervisor engine 204b, and thus the software RAID engine 204a may request the SCSI queues from the hypervisor engine 204b (e.g., the VMKernal described herein) based on the SCSI queue requirements and the number of processor cores that are available. However, while a few examples of command communication configuration operations have been described, one of skill in the art in possession of the present disclosure will appreciate how a variety of configuration operations may be performed in order to enable the communication functionality described below while remaining within the scope of the present disclosure.

In embodiments in which the software RAID engine 204a in the computing device 200 "holds", delays, and/or otherwise waits to perform the hypervisor registration operations 608 that register the controller device in the hypervisor engine 204b when receiving the hypervisor registration requests (e.g., "ScanDevice" ESXi calls) discussed above, following the command communication configuration operations at block 312 the software RAID engine 204a may perform the hypervisor registration operations 608 in response to each of those hypervisor registration requests (e.g., the software RAID engine 204a may enable I/O commands for each storage device corresponding to a respective "ScanDevice" ESXi call provided by the hypervisor engine 204b for that storage device). Following those hypervisor registration operations, or following the command configuration operations at block 312 in embodiments in which those hypervisor registration operations are performed upon receiving the hypervisor registration requests during block 306, the direct-attached storage device software RAID system completes initialization such that the RAID volume provided by the logical storage device is configured for use, and one of skill in the art in possession of the present disclosure will appreciate how a full RAID volume or partial RAID volume may be configured via the method 300 as described above, and may be used for runtime data, during boot/initialization, and/or for other RAID volume uses that would be apparent to one of skill in the art in possession of the present disclosure.

Figure 9:
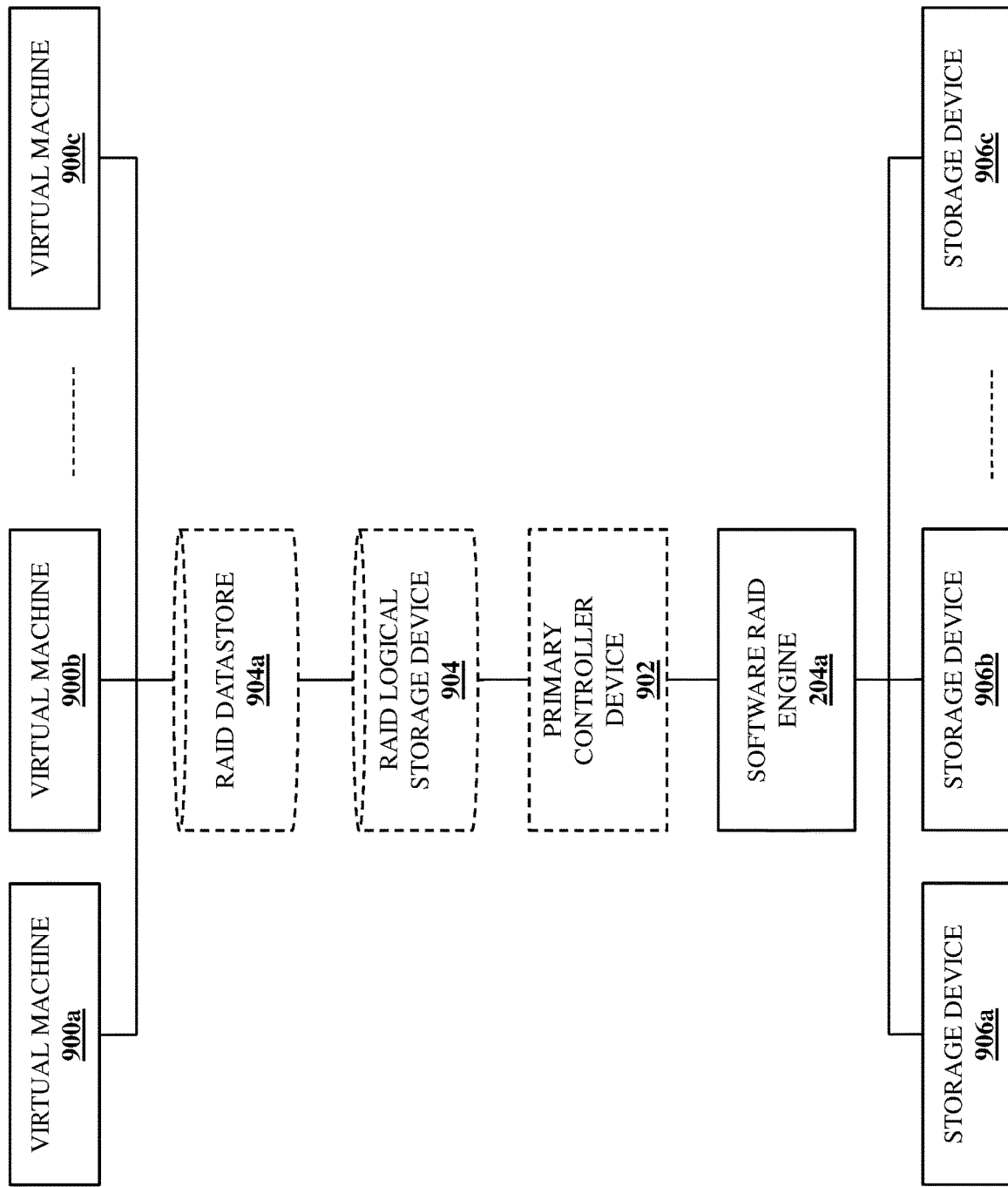
FIG. 9 is a schematic view illustrating an embodiment of the operation of the computing device of FIG. 2 during the method of FIG. 3.

The method 300 then proceeds to block 314 where the software RAID subsystem presents one of the controller devices to the hypervisor subsystem as a primary controller device that is connected to the logical storage device. With reference to FIG. 9, in an embodiment of block 314 and following the completion of the initialization of the direct-attached storage device software RAID system, the software RAID engine 204a may present, to a plurality of virtual machines 900a, 900b, and up to 900c that are provided by the hypervisor engine 204b in the computing device 200, a primary controller device 902 (which as discussed above is provided by one of the controller devices 206, 208a, or 210a) as being connected to a RAID logical storage device 904 that includes a RAID datastore 904a (e.g., which may be provided "on top" of RAID LUN(s)) and that is provided using a plurality of physical storage devices 906a, 906b, and up to 906c (which may be any of the storage devices 208a and 210 registered with the hypervisor engine 204b as discussed above). As will be appreciated by one of skill in the art in possession of the present disclosure, the RAID datastore 904a may be provided in the RAID logical storage device 904 when the hypervisor engine 204b is provided by the VMWARE® ESXi hypervisor discussed above, and refers to a partition that has a Virtual Machine File System (VMFS) file system type and that is created using VMWARE® tools (or the VMWARE® ESXi hypervisor itself) on top of RAID volumes/LUNs that are exposed to the VMWARE® ESXi hypervisor.

To provide a specific example, one of the controller device(s) 206 that is not connected to a storage device may be presented to the hypervisor engine 204b as being connected to the RAID logical storage device 904, although one of skill in the art in possession of the present disclosure will appreciate how any one of the controller devices 208a or 210a may be presented to the hypervisor engine 204b as being connected to the RAID logical storage device 904 while remaining within the scope of the present disclosure as well. As will be appreciated by one of skill in the art in possession of the present disclosure, any of the controller devices 206, 208a, and 210a that are not presented to the hypervisor engine 204b as being connected to the RAID logical storage device 904 may instead be presented to the hypervisor engine 204b as secondary controller devices that are not connected to the RAID logical storage device 904 or any of the storage devices 906a-906c (i.e., despite at least some of those controller devices being physically connected to those storage devices 906a-906c).

As such, each of the logical storage subsystems (e.g., virtual disks, RAID volumes, RAID LUNs, and/or logical storage subsystems known in the art) provided by the RAID logical storage device 904 are exposed to the virtual machines 900a-900c provided by the hypervisor engine 204b (e.g., the VMKernal discussed above) via the primary controller device 902. Thus, using some of the specific examples discussed above, each of the logical storage subsystems (e.g., virtual disks, RAID volumes, RAID LUNs, and/or logical storage subsystems known in the art) provided by storage devices 906a-906b may be presented to a user of the operating system provided by the operating system engine 204 as SCSI storage devices or otherwise being provided by SCSI storage devices.

Figure 10:
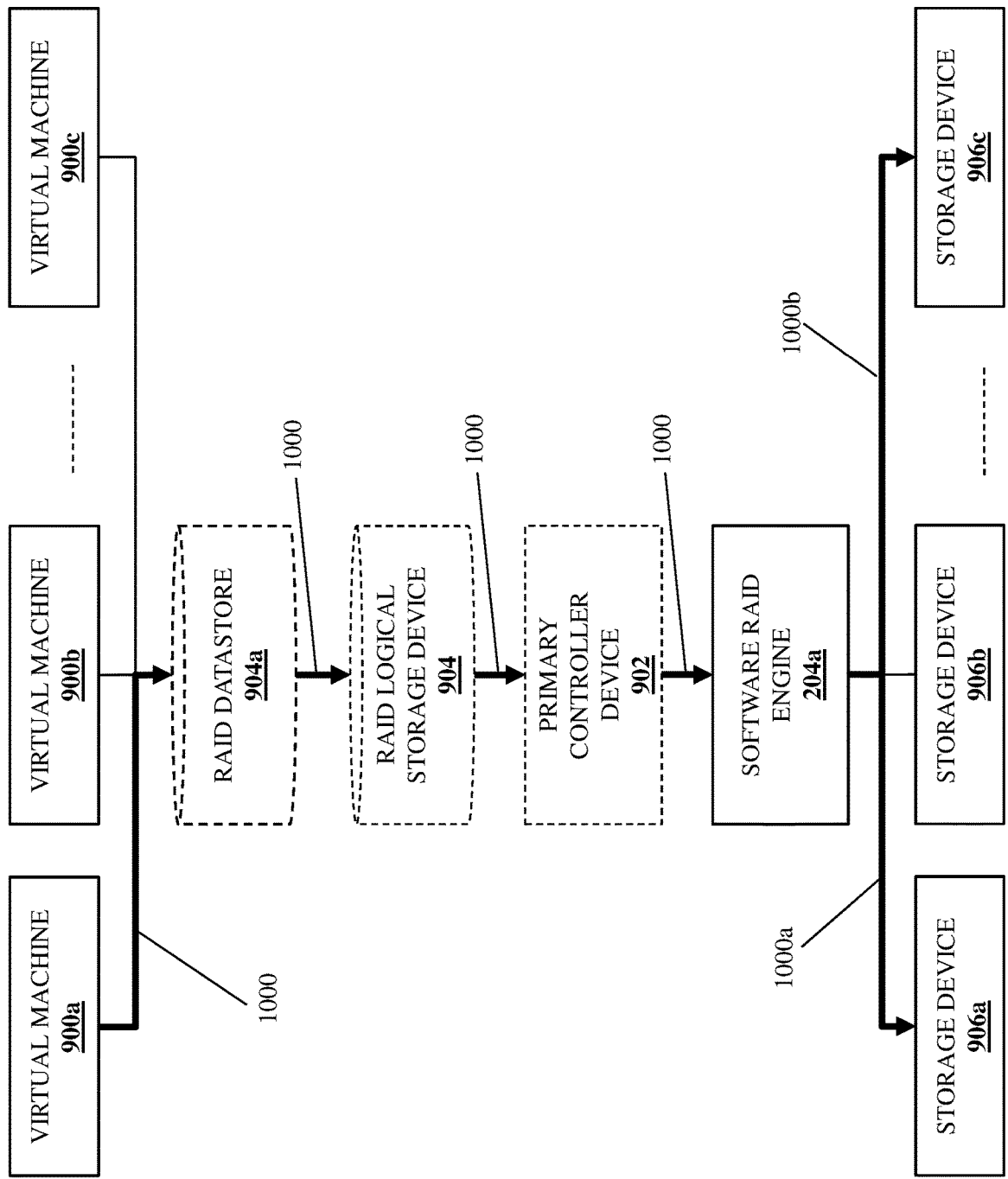
FIG. 10 is a schematic view illustrating an embodiment of the operation of the computing device of FIG. 2 during the method of FIG. 3.

The method 300 then proceeds to block 316 where the software RAID subsystem receives a command from the hypervisor subsystem that is directed to a primary controller device and that identifies a logical storage subsystem. With reference to FIG. 10, in an embodiment of block 316, the virtual machine 900a provided by the hypervisor engine 204b in the computing device 200 may perform command provisioning operations 1000 that include generating a command that identifies a logical storage subsystem provided by the RAID logical storage device 904 (e.g., via the RAID datastore 904a as illustrated in FIG. 10), and transmitting that command to the primary controller device 902 that is presented as being connected to the RAID logical storage device 904, which one of skill in the art in possession of the present disclosure will appreciate will result that in that command being received by the software RAID engine 204a in the computing device 200.

In an embodiment, the command transmitted by the virtual machine 900a provided by the hypervisor engine 204b to the software RAID engine 204a may include I/O commands such as a read command, a write command, and/or any other RAID commands that would be apparent to one of skill in the art in possession of the present disclosure. Furthermore, while the virtual machine 900a is illustrated and described as providing the command received by the software RAID engine 204a at block 316, one of skill in the art in possession of the present disclosure will appreciate how any of the virtual machines 900b-900c may provide commands in a similar manner while remaining within the scope of the present disclosure as well.

Using the specific example provided above in which the software RAID engine 204a is provided by a SCSI-based driver, any commands received at block 316 by the software RAID engine 204a from the virtual machines 900a-900c provided by the hypervisor engine 204b may be SCSI commands. Furthermore, as discussed in some of the specific examples above, the any commands received at block 316 by the software RAID engine 204a from the virtual machines 900a-900c may be mapped to SCSI queues in the hypervisor engine 204b that are used to communicate with the software RAID engine 204a provided by the SCSI-based driver, and thus the software RAID engine 206a may receive those commands via the accessing of those SCSI queues.

The method 300 then proceeds to block 318 where the software RAID subsystem transmits the command to a subset of physical storage devices that provide the logical storage subsystem via respective controller device(s) that couple the software RAID subsystem to that subset of physical storage devices. With continued reference to FIG. 10, in an embodiment of block 318, the software RAID engine 204a may perform command transmission operations 1000a and 100b that, in the specific example illustrated in FIG. 10, includes transmitting the command received at block 316 to the storage device 906a and the storage device 906c via their respective controller device(s) (e.g., any of the controller device(s) 208a and 210a) based on those storage devices 906a and 906c providing the logical storage subsystem identified in the command received by the software RAID engine 204a from the virtual machine 900a. As will be appreciated by one of skill in the art in possession of the present disclosure, the commands 1000a and 1000b transmitted to the storage devices 906a and 906c may be provided by modified versions of the command 1000 received from the virtual machine 900a (e.g., SCSI commands received from the virtual machine 900a may be translated to a protocol supported by the controller device/storage device to which it is transmitted.

For example, in response to receiving the command from the virtual machine 900a provided by the hypervisor engine 204b in the computing device 200, the software RAID engine 204a in the computing device 200 may determine which of the storage devices 906a-90bc provide the logical storage subsystem identified in that command (e.g., the storage devices 906a and 906c in this specific example). As discussed above, in some specific examples, SCSI queues in hypervisor engine 204b may be mapped to SAS, SATA, and/or NVMe protocol queues in the software RAID engine 204a, and thus the software RAID engine 204a may provide any commands received from the virtual machines 900a-900c in the protocol queues associated with the protocol utilized by the storage devices that provide the logical storage subsystem to which those commands are directed. As such, the command received by the software RAID engine 204a from the virtual machine 900a may be placed in a protocol queue associated with the protocol used by the storage device 906a, as well as in a protocol queue associated with the protocol used by the storage device 906c.

In embodiments in which the software RAID engine 204a is provided by a SCSI-based driver and the commands received from the virtual machine 900a are SCSI commands, in the event the storage devices 906a and/or 906c are SAS storage devices or otherwise use the SAS protocol, SCSI commands may be placed in a SAS protocol queue in the software RAID engine 204a and then transmitted to the storage devices 906a and/or 906c via their respective controller device(s) (e.g., any of the controller device(s) 208a and 210a). However, in the event the storage devices 906a and/or 906c are SATA storage devices or otherwise use the SATA protocol, SCSI commands may be placed in a SATA protocol queue in the software RAID engine 204a, translated using a SCSI translation layer in the software RAID engine 204a (e.g., a SCSI-to-Frame Information Structure (FIS) translation), and then transmitted to the storage devices 906a and/or 906c via their respective controller device(s) (e.g., any of the controller device(s) 208a and 210a). Similarly, in the event the storage devices 906a and/or 906c are NVMe storage devices or otherwise use the NVMe protocol, SCSI commands may be placed in an NVMe protocol queue in the software RAID engine 204a, translated using a SCSI translation layer in the software RAID engine 204a (e.g., a SCSI-to-NVMe translation), and then transmitted to the storage devices 906a and/or 906c via their respective controller device(s) (e.g., any of the controller device(s) 208a and 210a).

However, while a few specific examples of the translation of commands received from the virtual machines 900a-900c provided by the hypervisor engine 204b before providing them to the storage devices 906a-906c via their respective controller devices have been described, one of skill in the art in possession of the present disclosure will appreciate that other command translations may be performed while remaining within the scope of the present disclosure as well. For example, one of skill in the art in possession of the present disclosure will appreciate how a PCIe controller device connected to a SAS controller device will operate as a SAS controller that utilizes the SAS protocol, and thus no command translations may be needed in such situations. Similarly, a PCIe controller device connected to a SATA controller device will operate as a SATA controller that utilizes the SATA protocol, and thus SCSI-to-FIS translations may be needed in such situations.

The method 300 then returns to block 316. As such, the method 300 may loop such that the software RAID engine 204a in the computing device 200 receives commands from the virtual machines 900a-900c provided by the hypervisor engine 204b in the computing device 200 transmits those commands to the storage devices 906a-906c via their respective controllers as long as the storage devices 906a-906c are being used to provide the RAID logical storage device 904/RAID datastore 904a to the virtual machines 900a-900c. While not described in detail herein, in the event the storage devices 906a-906c will no longer be used to provide the RAID logical storage device 904/RAID datastore 904a to the virtual machines 900a-900c, the software RAID engine 204a may disconnect the controller device(s) 206, 208a, and 210a from the hypervisor engine 204b (e.g., via DetachDriver ESXi calls), as well as perform any other operations that would be apparent to one of skill in the art in possession of the present disclosure.

Thus, systems and methods have been described that provide for the presentation by a SCSI-based software RAID driver to a hypervisor of a single, primary PCIe controller device as being connected to a RAID logical storage device provided by a plurality of SAS, SATA, and/or NVMe physical storage devices, with the SCSI-based software RAID driver receiving I/O commands from the hypervisor that are directed to the primary PCIe controller device and that identify a RAID logical storage subsystem that is included in the RAID logical storage device, and transmitting those commands to a subset of the SAS, SATA, and/or NVMe physical storage devices that provide that RAID logical storage subsystem via respective PCIe controller device(s) that couple the SCSI-based software RAID driver to that subset of SAS, SATA, and/or NVMe physical storage devices. As such, software RAID support in hypervisor subsystem like the VMWARE® ESXi hypervisor discussed above is enabled in direct-attached storage device configurations for any types of storage devices and any types of CPUs, thus allowing the creation of a RAID using any available storage devices in a variety of computing devices. As such, RAID systems may be configured from a larger variety of storage devices and using spanned PCIe controllers, addressing several issues with the conventional RAID systems discussed above.

Figure 11:
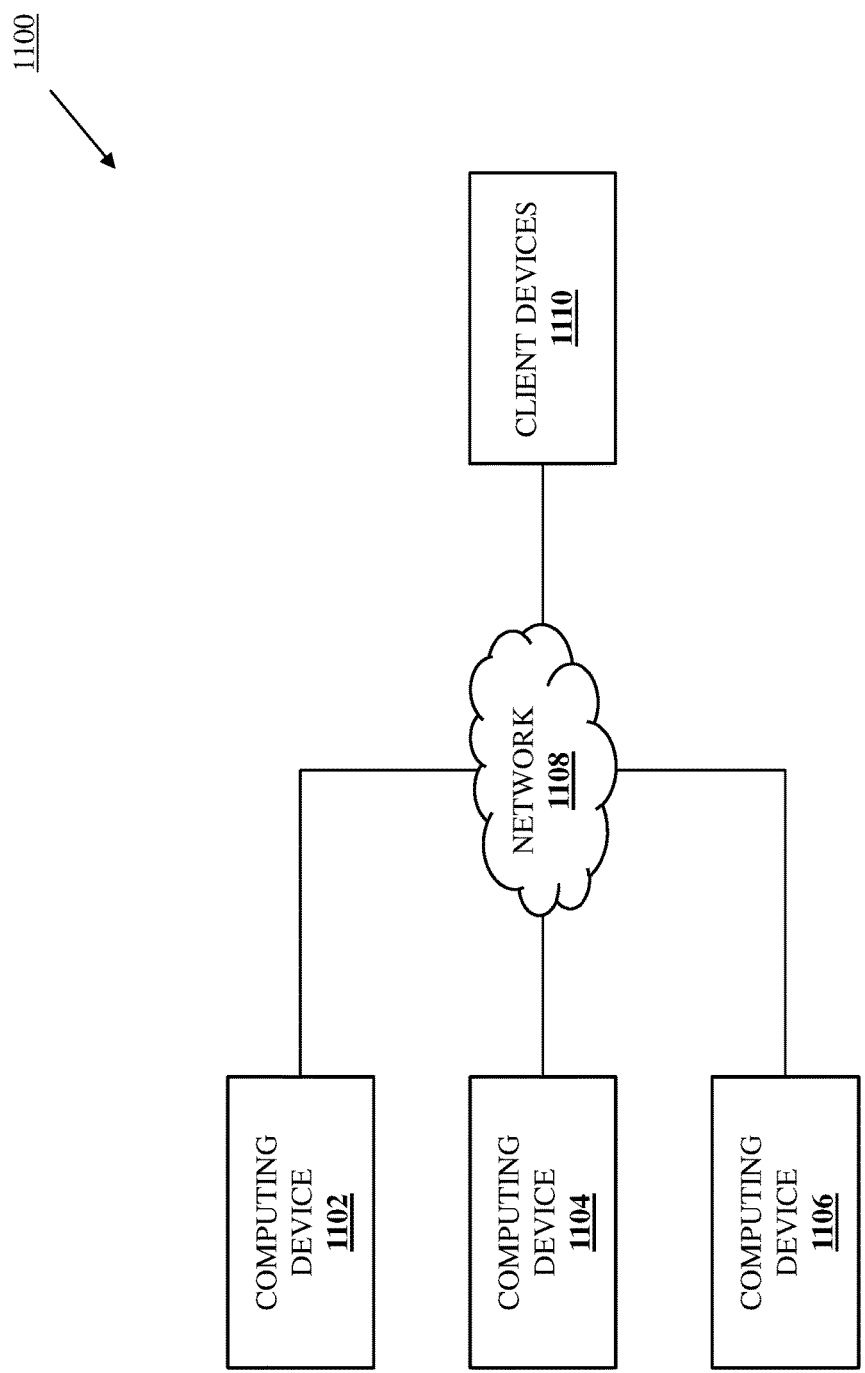
FIG. 11 is a schematic view illustrating an embodiment of a networked system 1100 that may include the software-RAID-protected boot data vSAN system of the present disclosure.

Referring now to FIG. 11, an embodiment of a networked system 1100 is illustrated that may include the software-RAID-protected boot data vSAN system of the present disclosure. In the illustrated embodiment, the networked system 1100 includes a plurality of computing devices 1102, 1104, and 1106 that, as discussed below, are configured to provide a vSAN system. In an embodiment, any or each of the computing devices 1102, 1104, and 1106 may be provided by the IHS 100 discussed above with reference to FIG. 1, and/or may include some or all of the components of the IHS 100, and in specific examples may be provided by server devices, storage systems, and/or other vSAN computing devices that would be apparent to one of skill in the art in possession of the present disclosure. However, while illustrated and discussed as being provided by particular vSAN computing devices, one of skill in the art in possession of the present disclosure will recognize that computing devices provided in the networked system 1100 may include any devices that may be configured to operate similarly as the computing devices 1102, 1104, and 1106 discussed below.

As illustrated, each of the computing devices 1102, 1104, and 1106 may be coupled to a network 1108 that may be provided by a Local Area Network (LAN), the Internet, combinations thereof, and/or any other networks that would be apparent to one of skill in the art in possession of the present disclosure. Furthermore, a plurality of client devices 1110 may be coupled to the network 1108 as well, and may be provided by any client devices that one of skill in the art in possession of the present disclosure would recognize as utilizing a vSAN system like that provided by the computing devices 1102-1106 described below. However, while a specific networked system 200 has been illustrated and described, one of skill in the art in possession of the present disclosure will recognize that the networked system of the present disclosure may include a variety of components and component configurations while remaining within the scope of the present disclosure as well.

Figure 12:
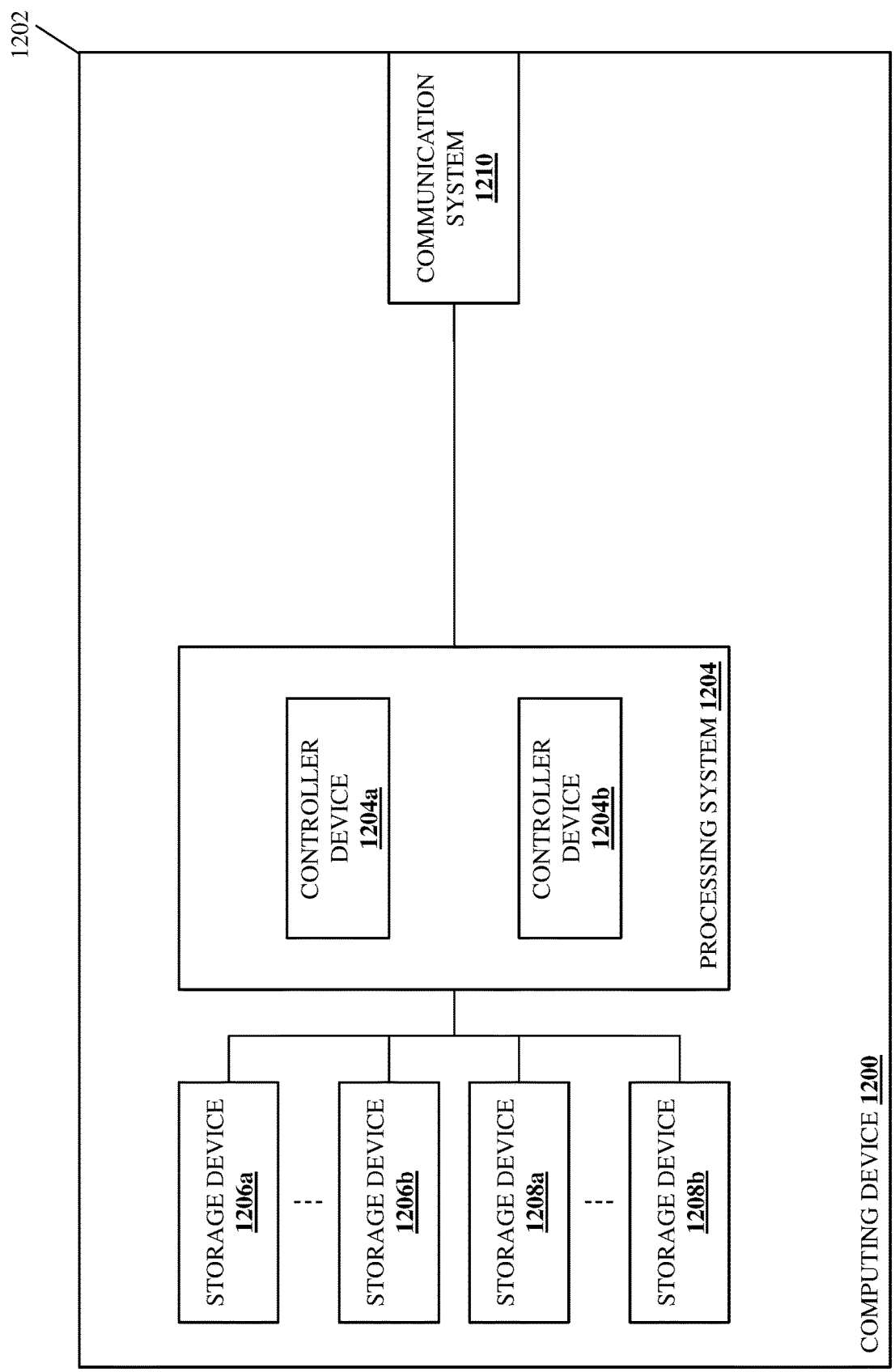
FIG. 12 is a schematic view illustrating an embodiment of a computing device that may be included in the networked system of FIG. 11 and that may provide the software-RAID-protected boot data vSAN system of the present disclosure.

Referring now to FIG. 12, an embodiment of a computing device 1200 is illustrated that may provide any or each of the computing devices 1102, 1104, and 1106 discussed above with reference to FIG. 11. As such, the computing device 1200 may be provided by the IHS 100 discussed above with reference to FIG. 1 and/or may include some or all of the components of the IHS 100, and in specific examples may be provided by server devices, storage systems, and/or other vSAN computing devices that would be apparent to one of skill in the art in possession of the present disclosure. Furthermore, while illustrated and discussed as being provided by particular vSAN computing devices, one of skill in the art in possession of the present disclosure will recognize that the functionality of the computing device 1200 discussed below may be provided by other devices that are configured to operate similarly as the computing device 1200 discussed below.

In the illustrated embodiment, the computing device 1200 includes a chassis 1202 that houses the components of the computing device 1200, only some of which are illustrated and discussed below. For example, the chassis 1202 may house a processing system 1204 (e.g., which may include the processor 102 discussed above with reference to FIG. 1 such as, for example, a Central Processing Unit (CPU) included in a Platform Controller Hub (PCH)) that, in the examples illustrated and described below, includes a pair of controller devices 1204a and 1204b that are provided by Serial Attached Small Computer System Interface (SCSI) (SAS) controller devices or Serial AT Attachment (SATA) controller devices. For example, the controller devices 1204a and 1204b included in the processing system 1204 may be provided by chipset controller devices in a chipset that couples the CPU described above to the other components in the computing device 1200, although one of skill in the art in possession of the present disclosure will appreciate how other controller devices will fall within the scope of the present disclosure as well. Furthermore, while the controller devices 1204a and 1204b are illustrated and described below as being included in the processing system 1204, one of skill in the art in possession of the present disclosure will appreciate how the controller devices 1204a and 1204b may be included in controller systems (e.g., the controller devices 1204a and 1204b may be included in respective HBA controller systems) that are coupled to the processing system 1204 while remaining within the scope of the present disclosure as well.

While not illustrated in FIG. 12, the chassis 1202 may also house a memory system (e.g., which may include the memory 114 discussed above with reference to FIG. 1 such as a Dynamic Random Access Memory (DRAM) memory system in the PCH discussed above) that is coupled to the processing system and that includes instructions that, when executed by the processing system, cause the processing system to provide the operating system engines, operating systems, software RAID engines, hypervisor engines, and/or other processing system functionality described below. The chassis 1202 may also house a storage system that includes a plurality of storage devices that are illustrated and described below as including the storage devices 1206a and up to 1206b, as well as the storage devices 1208a and up to 1208b, each of which is coupled to the processing system 1204 (e.g., via a backplane, not illustrated in FIG. 12). For example, any of the storage devices 1206a-1206b and 1208a-1208b may include the storage device 208b and/or 210 discussed above, and thus may be provided by SAS storage devices, SATA storage devices, Non-Volatile Memory express (NVMe) storage devices, Hard Disk Drive (HDD) storage devices, Solid State Drive (SSD) storage devices, and/or other storage device types that would be apparent to one of skill in the art in possession of the present disclosure.

The chassis 1202 may also house a communication system 1210 that is coupled to the processing system 1204 and that may be provided by a Network Interface Controller (NIC), wireless communication systems (e.g., BLUETOOTH®, Near Field Communication (NFC) components, WiFi components, etc.), and/or any other communication components that one of skill in the art in possession of the present disclosure would recognize as coupling the computing device 1200 to the client devices 1110 via the network 1108 as described above. However, while a specific computing device 1200 has been illustrated and described, one of skill in the art in possession of the present disclosure will recognize that computing devices (or other devices operating according to the teachings of the present disclosure in a manner similar to that described below for the computing device 1200) may include a variety of components (e.g., the Baseboard Management Controller (BMC) device discussed below) and/or component configurations for providing conventional computing device functionality, as well as the software-RAID-protected boot data functionality for the vSAN system discussed below, while remaining within the scope of the present disclosure as well.

Figure 13:
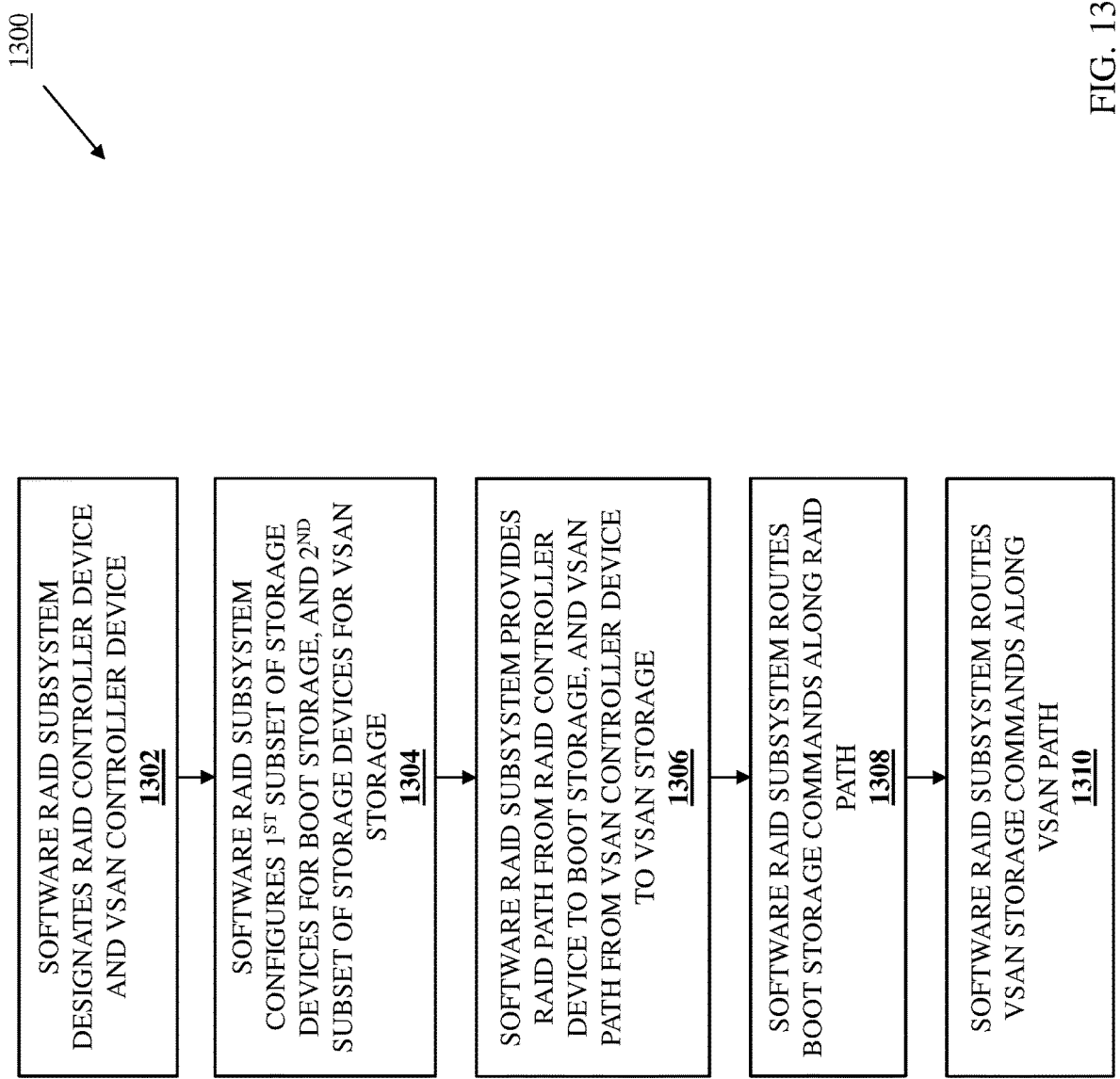
FIG. 13 is a flow chart illustrating an embodiment of a method for providing software RAID protection for boot data in a vSAN system.

Referring now to FIG. 13, an embodiment of a method 1300 for providing software RAID protection for boot data in a vSAN system is illustrated. As discussed below, the systems and methods of the present disclosure provide software RAID protection for boot data stored in storage devices included in a vSAN system. For example, the boot storage/vSAN storage software RAID system of the present disclosure may include a chassis housing a software RAID subsystem coupled to storage devices and to controller devices. The software RAID subsystem designates a RAID controller device and a vSAN controller device from the controller devices, and configures a first subset of the storage devices for boot storage and a second subset of the storage devices for vSAN storage. The software RAID subsystem then provides a RAID path from the RAID controller device to the boot storage provided by the first subset of the storage devices, and provides a vSAN path from the vSAN controller device to the vSAN storage provided by the second subset of the storage devices. The software RAID subsystem then routes boot storage commands along the RAID path, and routes vSAN storage commands along the vSAN path. As such, RAID protection of boot data stored in a vSAN system is enabled without the need for a hardware RAID controller device.

Figure 14:
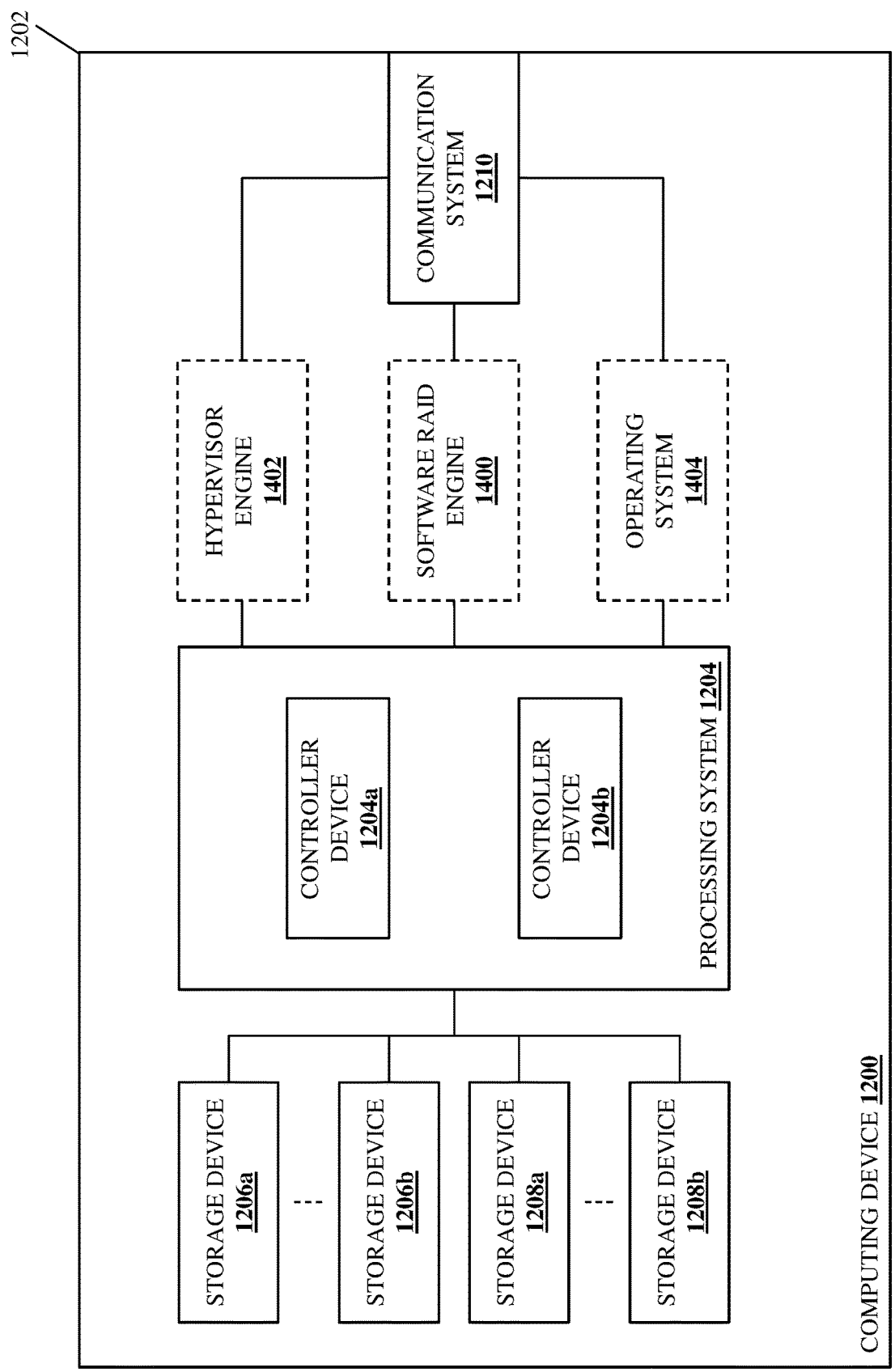
FIG. 14 is a schematic view illustrating an embodiment of the operation of the computing device of FIG. 12 during the method of FIG. 13.

The method 1300 begins at block 1302 where a software RAID subsystem designates a RAID controller device and a vSAN storage device. With reference to FIG. 14, in an embodiment of block 1302, the processing system 1204 may execute instructions that are stored on a memory system (not illustrated in FIG. 14) to provide a software RAID engine 1400 that is configured to provide the functionality of the software RAID engines and/or software RAID subsystems described herein, a hypervisor engine 1402 that is configured to provide the functionality of the hypervisor engines and/or hypervisor subsystems described herein, and an operating system 1404 that is configured to provide the functionality of the operating systems described herein. In some examples, as part of the boot, reset, reboot, or other initialization of the computing device 1200 that results in the provisioning of the software RAID engine 1400, the software RAID engine 1400 may designate the controller device 1204a in the processing system 1204 as a RAID controller device, and may designate the controller device 1204b in the processing system 1204 as a vSAN controller device.

To provide a specific example, the controller devices 1204a and 1204b may each be provided by one of a plurality of available chipset SAS or SATA controller devices that are included in a processing system of a PCH device and that may have been dedicated for use by the software RAID engine 1400 by a manufacturer of the computing device

1200, and at block 1302 the software RAID engine 1400 may designate one of those dedicated controller devices as the RAID controller device discussed below, and designate the other of those dedicated controller devices as the vSAN controller device discussed below. However, while a specific example of the dedication and designation of a RAID controller device and a vSAN controller device has been described, one of skill in the art in possession of the present disclosure will appreciate how the RAID controller device and a vSAN controller device may be designated in other manners (e.g., from respective HBA devices in the computing device 1200 rather than via respective controller devices in the processor system 1204 as described above) while remaining within the scope of the present disclosure as well.

The method 1300 then proceeds to block 1304 where the software RAID subsystem configures a first subset of storage devices for boot storage, and a second subset of storage devices for vSAN storage. In an embodiment, during or prior to the method 1300, an administrator or other user of the computing device 1200 may designate the storage devices 1206a-1206c (e.g., a subset of the storage devices in the computing device 1200) for boot storage (i.e., the storage of boot data for virtual machines provided by the hypervisor engine 1402) via metadata included in those storage devices 1206a-1206b, and may designate the storage devices 1208a-1208c (e.g., a subset of the storage devices in the computing device 1200) for vSAN storage (i.e., the storage of vSAN data for a vSAN provided by the operating system 1404) via metadata included in those storage devices 1206a-1206b. Furthermore, during boot, reset, reboot, or other initialization of the computing device 1200, the administrator or other user may configure a RAID for the storage devices 1206a-1206b that are designated for boot storage using, for example, a Unified Extensible Firmware Interface (UEFI) Human Interface Infrastructure (HII) subsystem included in the computing device 1200, and that RAID configuration for those storage devices 1206a-1206b may be identified in the metadata included in those storage devices 1206a-1206b as well. Further still, while not described in detail herein, the administrator or other user may also configure a RAID for any storage devices in the computing device 1200 (not illustrated or described below) that are designated for non-boot data storage in a similar manner (e.g., using the UEFI HII subsystem described above).

Figure 15:
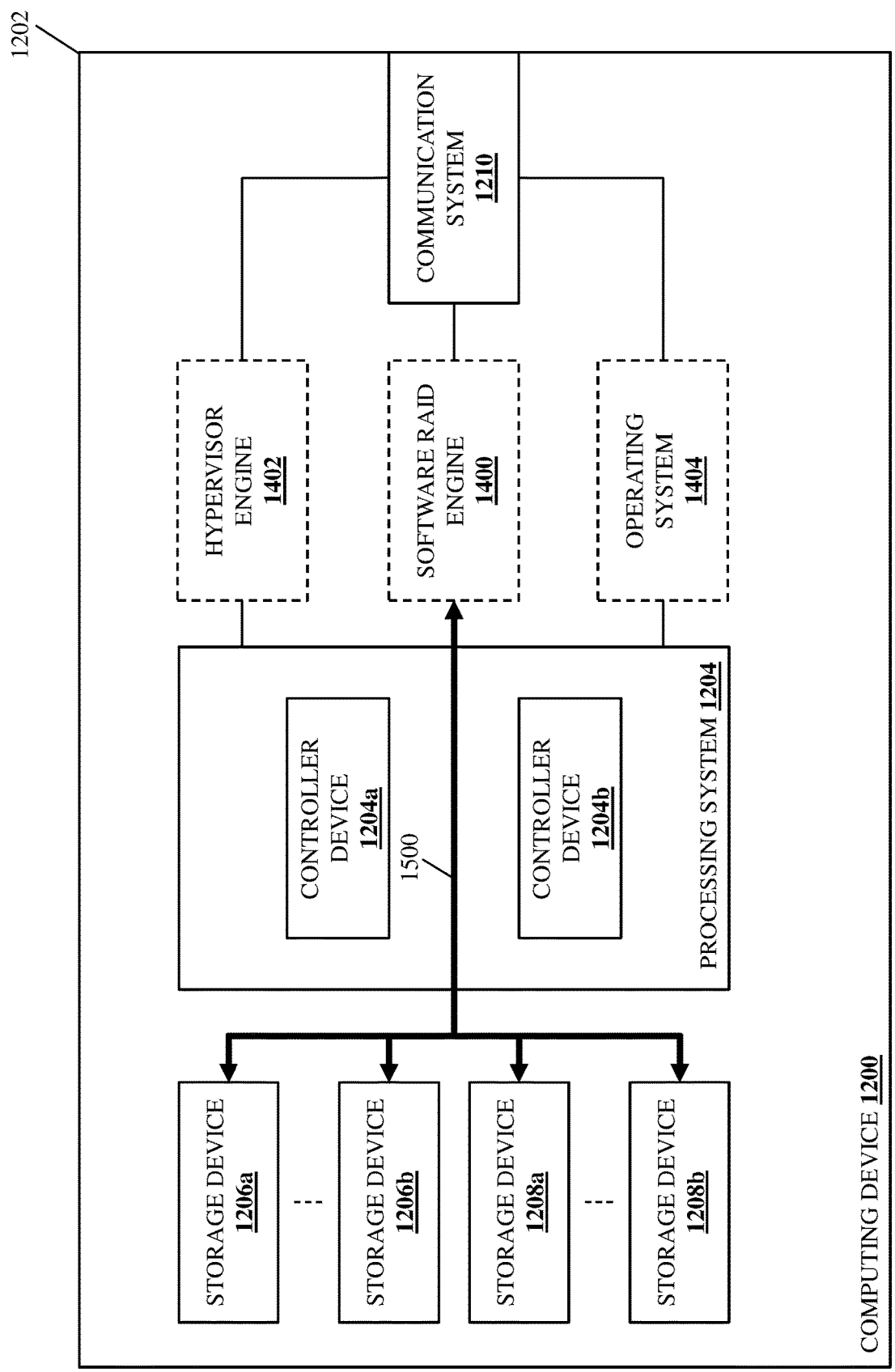
FIG. 15 is a schematic view illustrating an embodiment of the operation of the computing device of FIG. 12 during the method of FIG. 13.

With reference to FIG. 15, in an embodiment of block 1304, the software RAID engine 1400 may perform discovery/initialization operations 1500 that may include discovering each of the storage devices 1206a-1206b and 1208a-1208b, initializing each of the storage devices 1206a-1206b and 1208a-1208b, retrieving metadata from each of the storage devices 1206a-1206b and 1208a-1208b, and/or performing any other operations that one of skill in the art in possession of the present disclosure will recognize as enabling the functionality described below. As discussed above, the metadata retrieved from each of the storage devices 1206a-1206b and 1208a-1208b will indicate whether that storage device is designated for boot storage and configured as part of a RAID, or designated for vSAN storage. In a specific example, metadata in the storage devices in the computing device 1200 may simply designate whether or not that storage device is configured as part of a RAID, and in the event that storage device is not designated as part of a RAID, the software RAID engine 1400 may assume that storage device is designated as part of a vSAN. However, while specific examples of the use of metadata to determine whether a storage device should be used for RAID-protected boot storage or a vSAN have been described, one of skill in the art in possession of the present disclosure will appreciate how storage devices in a computing device may be designated for RAID-protected boot storage or a vSAN using other techniques that will fall within the scope of the present disclosure as well.

Figure 16:
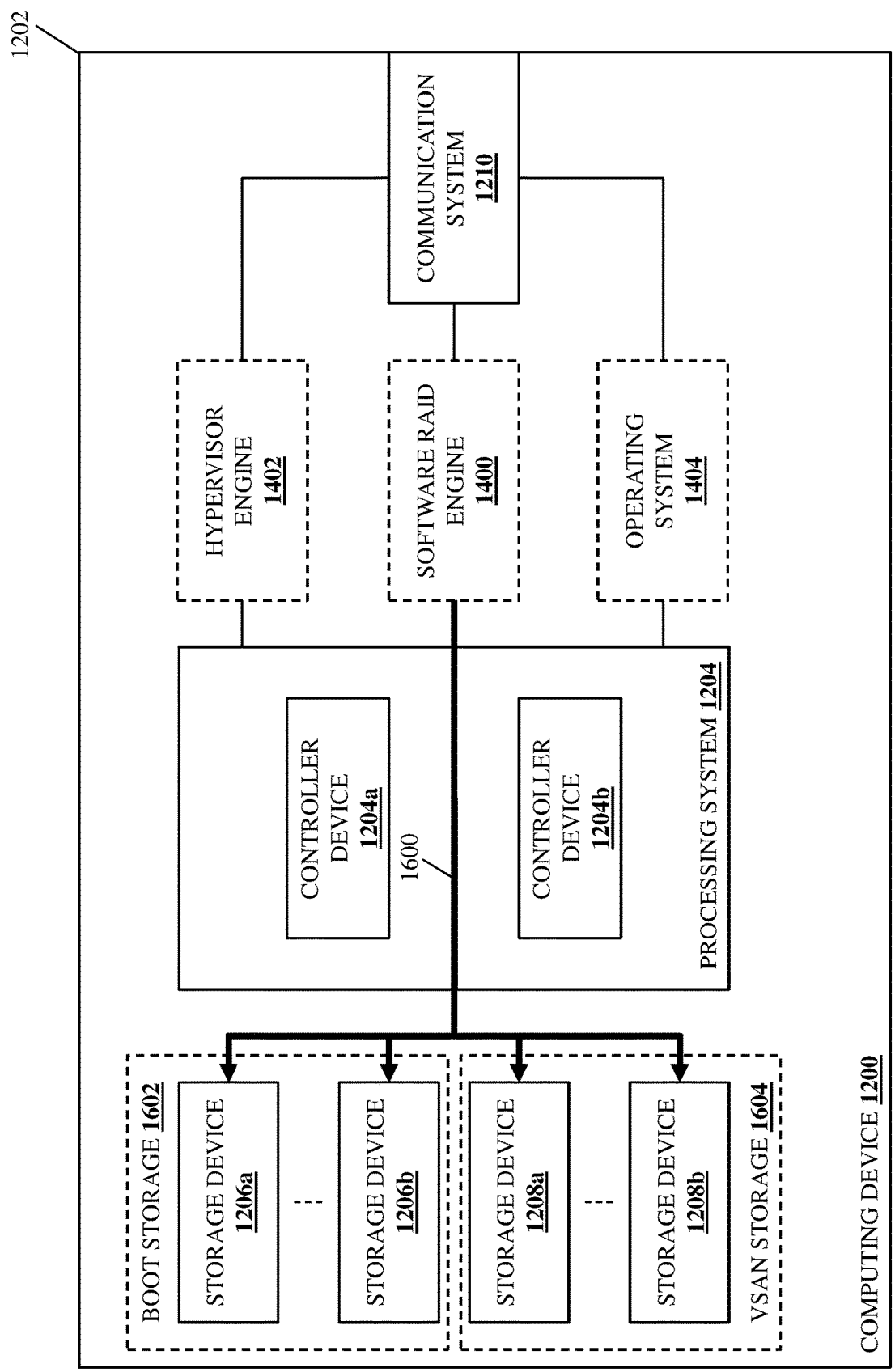
FIG. 16 is a schematic view illustrating an embodiment of the operation of the computing device of FIG. 12 during the method of FIG. 13.

With reference to FIG. 16, in an embodiment of block 1304 and following the discovery/initialization operations 1500 and the retrieval of the metadata from the storage devices 1206a-1206b and 1208a-1208b, the software RAID engine 1400 may perform storage device configuration operations 1600 that may include configuring the storage devices 1206a-1206b for boot storage 1602 based on their boot storage designation in their metadata described above, and configuring the storage devices 1208a-1208b for vSAN storage 1604 based on their vSAN storage designation in their metadata described above. For example, the storage device configuration operations 1600 that configure the storage devices 1206a-1206b as the boot storage 1602 may include using any of a variety of RAID techniques known in the art to create a RAID storage device pool for use in the storage of boot data, and providing the storage devices 1206a-1206b in that RAID storage device pool (e.g., based on the metadata retrieved from those storage devices 1206a-1206b as discussed above), and one of skill in the art in possession of the present disclosure will appreciate how a RAID storage device pool may also be created for use in the storage of non-boot data on other storage devices in the computing device 200 (not illustrated) while remaining within the scope of the present disclosure as well.

Similarly, the storage device configuration operations 1600 that configure the storage devices 1208a-1208b as the vSAN storage 1604 may include using any of a variety of vSAN techniques known in the art on the storage devices 1208a-1208b to create a vSAN storage device pool for use in the storage of vSAN data, and providing the storage devices 1208a-1208b in that vSAN storage device pool (e.g., based on the metadata retrieved from those storage devices 1208a-1208b as discussed above). As will be appreciated by one of skill in the art in possession of the present disclosure, the configuration of the storage devices 1208a-1208b as the vSAN storage 1604 may include the software RAID engine 1400 identifying and including a Solid State Drive (SSD) storage device as one of the storage devices 1208a-1208b (e.g., for use as a cache in the vSAN system and/or for other vSAN operations that would be apparent to one of skill in the art in possession of the present disclosure).

Figure 17:
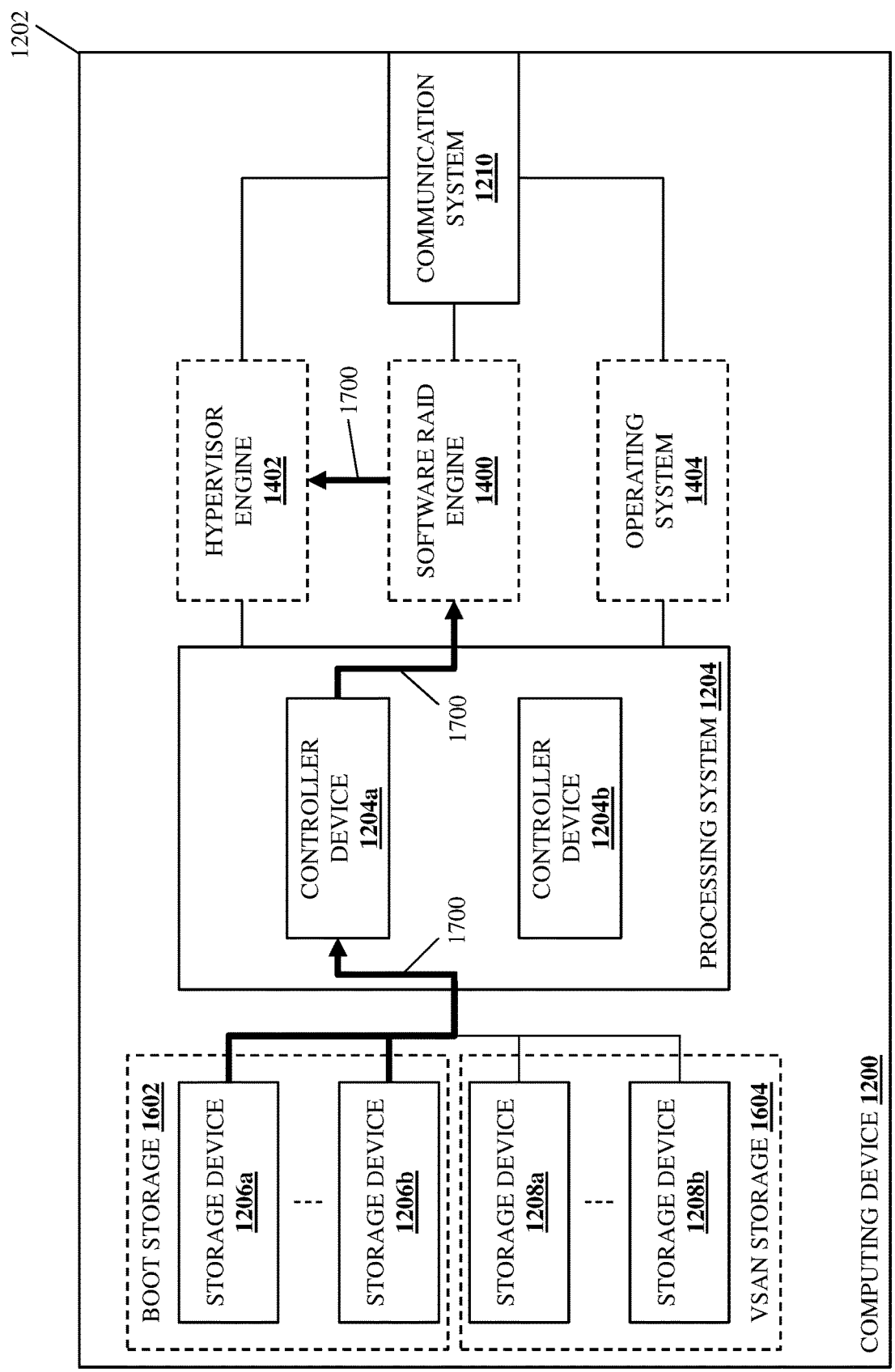
FIG. 17 is a schematic view illustrating an embodiment of the operation of the computing device of FIG. 12 during the method of FIG. 13.

The method 1300 then proceeds to block 1306 where the software RAID subsystem provides a RAID path from the RAID controller device to the boot storage, and a vSAN path from the vSAN controller device to the vSAN storage. With reference to FIG. 17, in an embodiment of block 1306, the storage RAID engine 1400 may perform RAID path provisioning operations 1700 that include providing a "RAID path" to the boot storage 1602 provided by the storage devices 1206a-1206c via the controller device 1204a that was designated as the RAID controller device, and presenting that RAID path to the hypervisor engine 1402. Similarly as described above, the controller device 1204a designated as the RAID controller device may be presented to the hypervisor engine 1402 as a "primary" controller device that is connected to the boot storage 1602 (i.e., a logical storage device) provided by the storage devices 1206a-1206b. As such, even if the storage devices 1206a-1206b include and/or are connected to other controller devices, the hypervisor engine 1402 will view the controller device 1204a as being directly connected to and/or otherwise exposing the RAID volumes that provide the boot storage 1602 provided by the storage devices 1206a-1206b.

Figure 18:
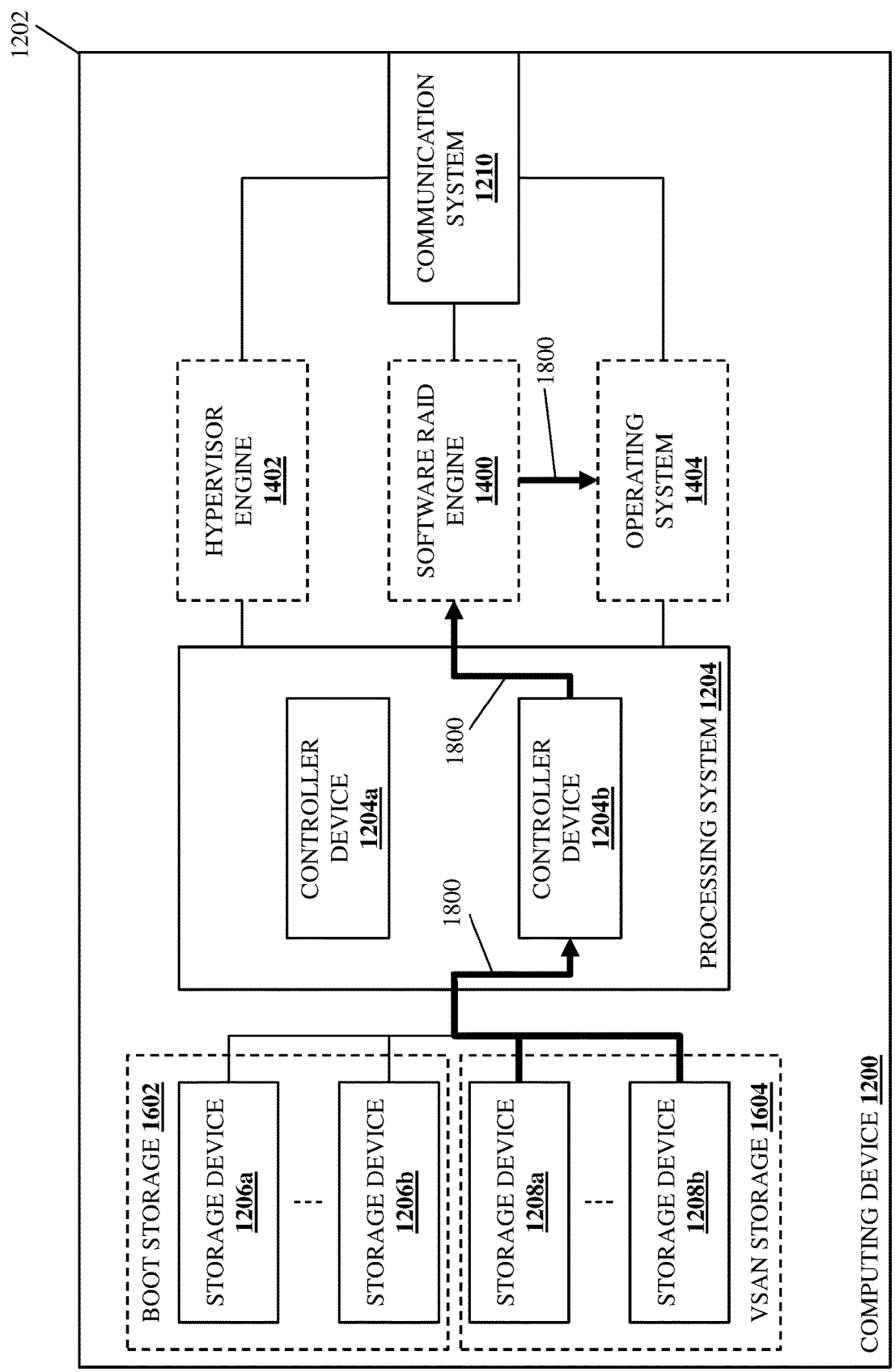
FIG. 18 is a schematic view illustrating an embodiment of the operation of the computing device of FIG. 12 during the method of FIG. 13.

With reference to FIG. 18, in an embodiment of block 1306, the storage RAID engine 1400 may also perform vSAN path provisioning operations 1800 that include providing a "vSAN path" to the vSAN storage 1604 provided by the storage devices 1208a-1208c via the controller device 1204b that was designated as the vSAN controller device, and presenting that vSAN path to the operating system 1404. As such, the controller device 1204b designated as the vSAN controller device may expose each of the storage devices 1208a-1208b that provide the vSAN storage 1604 to the operating system 1404 using any of a variety of vSAN techniques that would be apparent to one of skill in the art in possession of the present disclosure. Thus, a separate RAID path and vSAN path are created for the boot storage 1602 and the vSAN storage 1604, respectively, allowing for the handling of separate boot storage commands and vSAN commands as described below and as required by vSAN systems such as those provided by VMWARE® Inc. of Palo Alto, California, United States.

Figure 19:
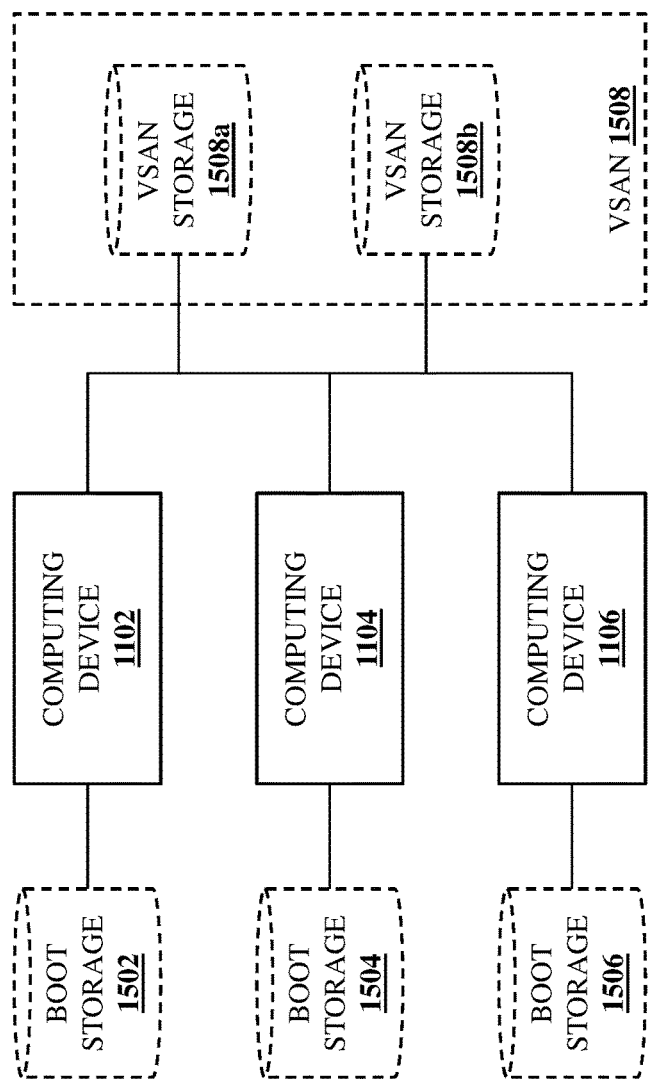
FIG. 19 is a schematic view illustrating an embodiment of the operation of the networked system of FIG. 11 during the method of FIG. 13.

With reference to FIG. 19, an embodiment of a vSAN system 1900 provided via the networked system 1100 of FIG. 11 is illustrated. As will be appreciated by one of skill in the art in possession of the present disclosure, the vSAN system 1900 may include the computing devices 1102 and 1104 operating as "primary" hosts, and the computing device 1106 operating as a "witness" host. As can be seen, the operations of each of the computing devices 1102-1106 during blocks 1302-1306 of the method 1300 may result in each of the computing devices 1102, 1104, and 1106 providing a respective RAID-protected boot storage 1502, 1504, and 1506 for use in initialization operations by virtual machines that are provided by the hypervisor engine 1402 and that are used by the client devices 1110, as well as providing a vSAN 1508 including vSAN storage 1508a and 1508b for use in runtime data-storage operations by the virtual machines that are provided by the hypervisor engine 1402 and that are used by the client devices 1110.

Figure 20:
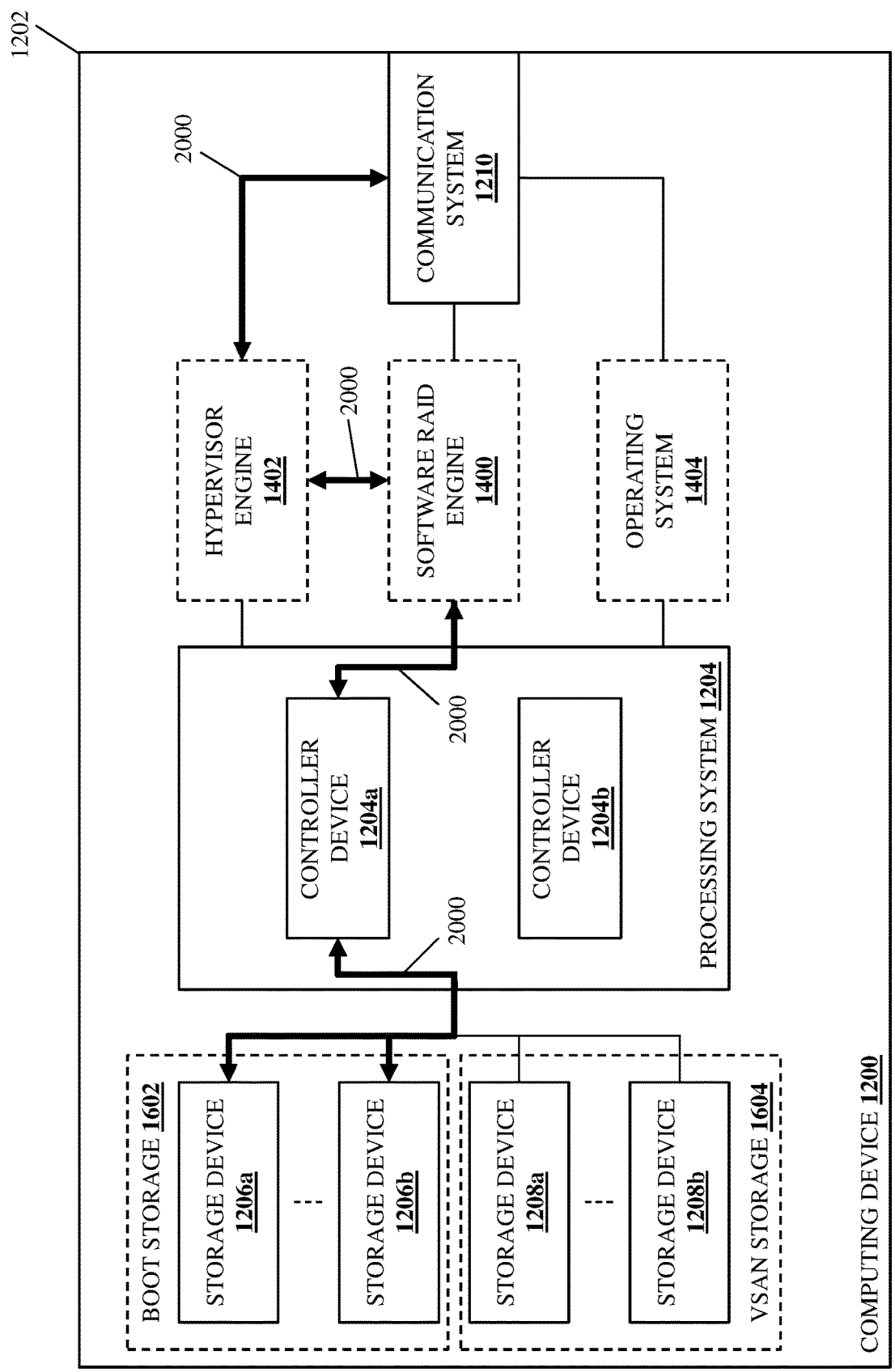
FIG. 20 is a schematic view illustrating an embodiment of the operation of the computing device of FIG. 12 during the method of FIG. 13.

The method 1300 then proceeds to block 1308 where the software RAID subsystem routes boot storage commands along the RAID path. With reference to FIG. 20, in an embodiment of block 1308, the software RAID engine 1400 may perform boot storage communication routing operations 2000 that include routing any of a variety of boot storage communications along the RAID path between the hypervisor engine 1402 and the storage devices 1206a-1206b that provide the boot storage 1602 via the controller device 1204a. Similarly as described above, in the event the storage devices 1206a-1206b that provide the boot storage 1602 are SAS storage devices, no translation of SCSI boot storage commands will be necessary. However, in the event the storage 1206a-1206b that provide the boot storage 1602 are SATA storage devices or otherwise use the SATA protocol, SCSI boot storage commands may be translated using a SCSI translation layer in the software RAID engine 1400 (e.g., a SCSI-to-FIS translation), and then transmitted to the storage 1206a-1206b. Similarly, in the event the storage 1206a-1206b are NVMe storage devices or otherwise use the NVMe protocol, SCSI boot storage commands may be translated using a SCSI translation layer in the software RAID engine 1400 (e.g., a SCSI-to-NVMe translation), and then transmitted to the storage 1206a-1206b.

Figure 21:
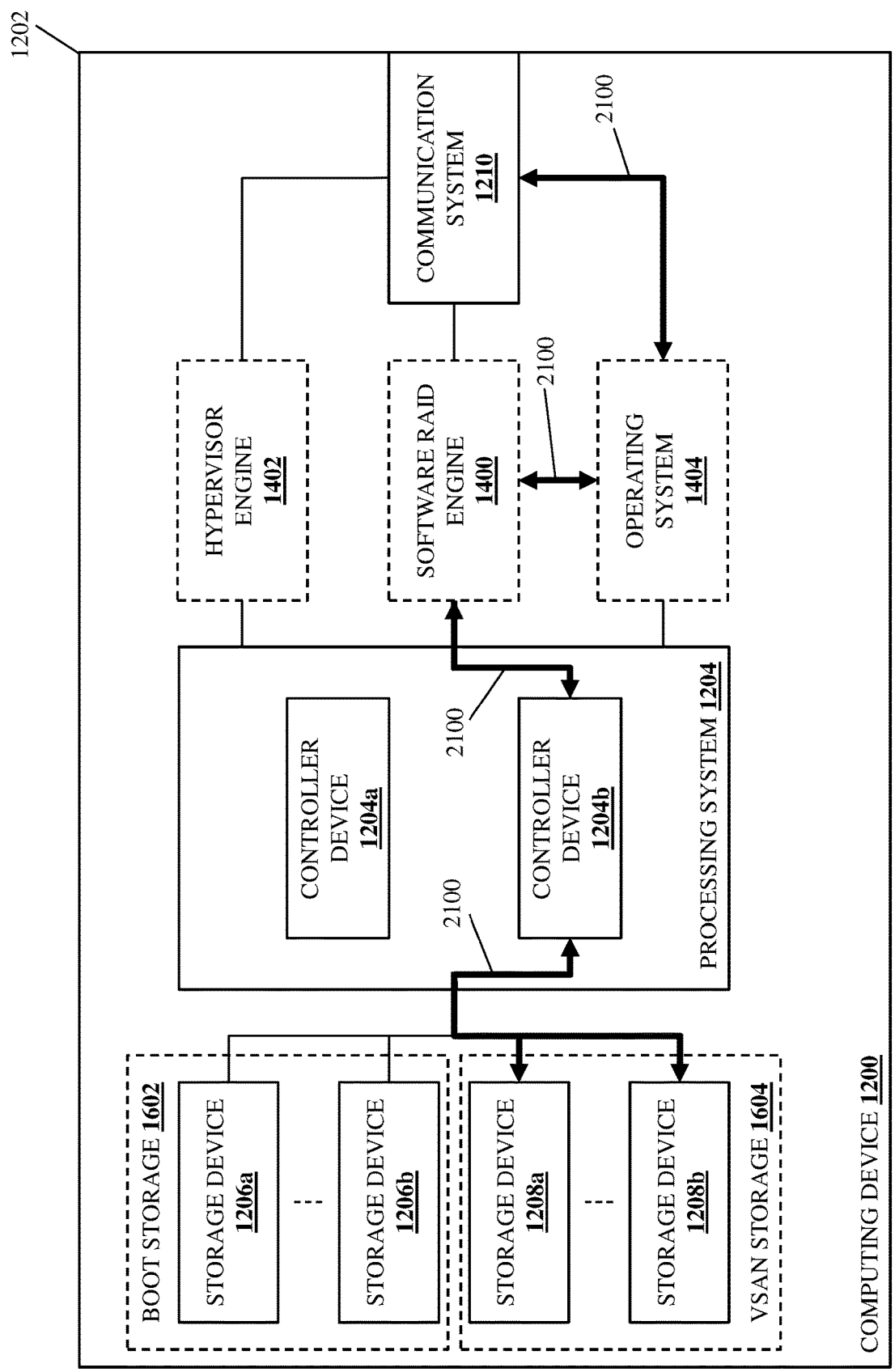
FIG. 21 is a schematic view illustrating an embodiment of the operation of the computing device of FIG. 12 during the method of FIG. 13.

The method 1300 then proceeds to block 1310 where the software RAID subsystem routes vSAN storage commands along the vSAN path. With reference to FIG. 21, in an embodiment of block 1310, the software RAID engine 1400 may perform vSAN storage communication routing operations 2100 that include routing any of a variety of vSAN storage communications along the vSAN path between the operating system 1404 and the storage devices 1208a-1208b that provide the vSAN storage 1604 via the controller device 1204b, and one of skill in the art in possession of the present disclosure will appreciate how at least some of those vSAN storage communications may be transmitted and/or received via the communication system 1210 in the computing device 1200 as well.

Thus, systems and methods have been described that provide a vSAN system with software RAID protection for boot data. For example, the software-RAID-protected boot data vSAN system of the present disclosure may include a chassis housing a software RAID subsystem coupled to storage devices and to controller devices. The software RAID subsystem designates a RAID controller device and a vSAN controller device from the controller devices, and configures a first subset of the storage devices for boot storage and a second subset of the storage devices for vSAN storage. The software RAID subsystem then provides a RAID path from the RAID controller device to the boot storage provided by the first subset of the storage devices, and provides a vSAN path from the vSAN controller device to the vSAN storage provided by the second subset of the storage devices. The software RAID subsystem then routes boot storage commands along the RAID path, and routes vSAN storage commands along the vSAN path. As such, RAID protection of boot data stored in a vSAN system is enabled without the need for a hardware RAID controller device.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A software-Redundant Array of Independent Disk (RAID)-protected boot data virtual Storage Area Network (vSAN) system, comprising:
   a chassis;
   a plurality of storage devices that are housed in the chassis;
   a first controller device and a second controller device that are coupled to the plurality of storage devices; and
   a software Redundant Array of Independent Disk (RAID) subsystem that is housed in the chassis, and that is coupled to the plurality of storage devices, to the first controller device and to the second controller device, wherein the software RAID subsystem is configured to:
      select the first controller device as a dedicated RAID controller device and the second controller device as a dedicated virtual Storage Area Network (vSAN) controller device;
      configure a first subset of the plurality of storage devices for boot storage and a second subset of the plurality of storage devices for vSAN storage;
      provide a RAID path from the dedicated RAID controller device to the boot storage provided by the first subset of the plurality of storage devices;
      provide a vSAN path from the dedicated vSAN controller device to the vSAN storage provided by the second subset of the plurality of storage devices;

route boot storage commands along the RAID path to the second subset of the plurality of storage devices using the dedicated RAID controller device; and route vSAN storage commands along the vSAN path to the first subset of the plurality of storage devices using the dedicated vSAN controller device.

2. The system of claim 1, wherein the first controller device and the second controller device are each provided by a respective chipset controller devices that is included in a processing system.

3. The system of claim 1, wherein the configuring the first subset of the plurality of storage devices for boot storage and a second subset of the plurality of storage devices for vSAN storage includes:

retrieving metadata from each of the plurality of storage devices that identifies whether that storage device should be used for boot storage or vSAN storage; and configuring, based on the metadata, a RAID storage device pool that includes the first subset of the plurality of storage devices, and a vSAN storage device pool that includes the second subset of the plurality of storage devices.

4. The system of claim 1, wherein the software RAID subsystem is configured to:

expose, to a hypervisor subsystem using the dedicated RAID controller device, the boot storage; and expose, to an operating system using the dedicated vSAN controller device, the vSAN storage.

5. The system of claim 1, wherein the software RAID subsystem is configured to:

translate at least one of the boot storage commands prior to routing that boot storage command along the RAID path.

6. The system of claim 1, wherein the software RAID subsystem is configured to:

identify and include a Solid State Drive (SSD) storage device in the second subset of the plurality of storage devices configured for vSAN storage.

7. An Information Handling System (IHS), comprising:

a processing system; and a memory system that is coupled to the processing system and that includes instructions that, when executed by the processing system, cause the processing system to provide a software Redundant Array of Independent Disk (RAID) engine that is configured to:

select a first controller devices as a dedicated RAID controller device and a second controller device as a dedicated virtual Storage Area Network (vSAN) controller device;

configure a first subset of a plurality of storage devices that are coupled to the processing system for boot storage and a second subset of the plurality of storage devices for vSAN storage;

provide a RAID path from the dedicated RAID controller device to the boot storage provided by the first subset of the plurality of storage devices;

provide a vSAN path from the dedicated vSAN controller device to the vSAN storage provided by the second subset of the plurality of storage devices;

route boot storage commands along the RAID path to the second subset of the plurality of storage devices using the dedicated RAID controller device; and route vSAN storage commands along the vSAN path to the first subset of the plurality of storage devices using the dedicated vSAN controller device.

8. The IHS of claim 7, wherein the first controller devices and the second controller device are each provided by a respective chipset controller devices that is included in the processing system.

9. The IHS of claim 7, wherein the configuring the first subset of the plurality of storage devices for boot storage and a second subset of the plurality of storage devices for vSAN storage includes:

retrieving metadata from each of the plurality of storage devices that identifies whether that storage device should be used for boot storage or vSAN storage; and configuring, based on the metadata, a RAID storage device pool that includes the first subset of the plurality of storage devices, and a vSAN storage device pool that includes the second subset of the plurality of storage devices.

10. The IHS of claim 7, wherein the software RAID engine is configured to:

expose, to a hypervisor subsystem using the dedicated RAID controller device, the boot storage; and expose, to an operating system using the dedicated vSAN controller device, the vSAN storage.

11. The IHS of claim 7, wherein the software RAID engine is configured to:

translate at least one of the boot storage commands prior to routing that boot storage command along the RAID path.

12. The IHS of claim 7, wherein the RAID controller device is provided by a first Host Bus Adapter (HBA) device coupled to the processing system, and the vSAN controller device is provided by a second HBA device coupled to the processing system.

13. The IHS of claim 7, wherein the software RAID engine is configured to:

identify and include a Solid State Drive (SSD) storage device in the second subset of the plurality of storage devices configured for vSAN storage.

14. A method for providing software Redundant Array of Independent Disk (RAID) protection for boot data in a virtual Storage Area Network (vSAN) system, comprising:

selecting, by a software Redundant Array of Independent Disk (RAID) subsystem, first controller devices as a dedicated RAID controller device and second controller device as a dedicated virtual Storage Area Network (vSAN) controller device;

configuring, by the software RAID subsystem, a first subset of a plurality of storage devices for boot storage and a second subset of the plurality of storage devices for vSAN storage;

providing, by the software RAID subsystem, a RAID path from the dedicated RAID controller device to the boot storage provided by the first subset of the plurality of storage devices;

providing, by the software RAID subsystem, a vSAN path from the dedicated vSAN controller device to the vSAN storage provided by the second subset of the plurality of storage devices;

routing, by the software RAID subsystem, boot storage commands along the RAID path to the second subset of the plurality of storage devices using the dedicated RAID controller device; and routing, by the software RAID subsystem, vSAN storage commands along the vSAN path to the first subset of the plurality of storage devices using the dedicated vSAN controller device.

15. The method of claim 14, wherein the first controller device and the second controller device are each provided by a respective chipset controller devices that is included in a processing system that is coupled to the plurality of storage devices.

16. The method of claim 14, wherein the configuring the first subset of the plurality of storage devices for boot storage and a second subset of the plurality of storage devices for vSAN storage includes:
retrieving metadata from each of the plurality of storage devices that identifies whether that storage device should be used for boot storage or vSAN storage; and
configuring, based on the metadata, a RAID storage device pool that includes the first subset of the plurality of storage devices, and a vSAN storage device pool that includes the second subset of the plurality of storage devices.

17. The method of claim 14, further comprising:
exposing, by the software RAID subsystem to a hypervisor subsystem using the dedicated RAID controller device, the boot storage; and
exposing, by the software RAID subsystem to an operating system using the dedicated vSAN controller device, the vSAN storage.

18. The method of claim 14, further comprising:
translating, by the software RAID subsystem, at least one of the boot storage commands prior to routing that boot storage command along the RAID path.

19. The method of claim 14, wherein the RAID controller device is provided by a first Host Bus Adapter (HBA) device coupled to the software RAID subsystem, and the vSAN controller device is provided by a second HBA device coupled to the software RAID subsystem.

20. The method of claim 14, further comprising:
identifying and including, by the software RAID subsystem, a Solid State Drive (SSD) storage device in the second subset of the plurality of storage devices configured for vSAN storage.

* * * * *

UNITED STATES PATENT AND TRADEMARK OFFICE
CERTIFICATE OF CORRECTION

PATENT NO. : 12,353,772 B2
APPLICATION NO. : 18/227926
DATED : July 8, 2025
INVENTOR(S) : Nikhith Ganigarakoppal Kantharaju et al.

Page 1 of 1

It is certified that error appears in the above-identified patent and that said Letters Patent is hereby corrected as shown below:

In the Claims

Column 27, Line 9, Claim 2, "a respective chipset controller devices" should read --a respective chipset controller device--

Column 27, Line 48, Claim 7, "a first controller devices" should read --a first controller device--

Column 28, Line 1, Claim 8, "the first controller devices" should read --the first controller device--

Column 28, Lines 2-3, Claim 8, "a respective chipset controller devices" should read --a respective chipset controller device--

Column 28, Line 42, Claim 14, "first controller devices" should read --a first controller device--

Column 29, Line 1, Claim 15, "a respective chipset controller devices" should read --a respective chipset controller device--

Signed and Sealed this
Sixteenth Day of September, 2025

Coke Morgan Stewart
*Acting Director of the United States Patent and Trademark Office*